US011632206B2

(12) United States Patent
Chen et al.

(10) Patent No.: US 11,632,206 B2
(45) Date of Patent: Apr. 18, 2023

(54) METHOD AND APPARATUS FOR OBTAINING RESOURCE INDICATION VALUE

(71) Applicant: HUAWEI TECHNOLOGIES CO., LTD., Guangdong (CN)

(72) Inventors: Zheng Chen, Beijing (CN); Xu Zhang, Beijing (CN); Hua Li, Shanghai (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 207 days.

(21) Appl. No.: 17/085,330

(22) Filed: Oct. 30, 2020

(65) Prior Publication Data

US 2021/0050970 A1 Feb. 18, 2021

Related U.S. Application Data

(63) Continuation of application No. 16/730,419, filed on Dec. 30, 2019, now Pat. No. 10,841,055, which is a (Continued)

(30) Foreign Application Priority Data

Apr. 2, 2018 (CN) ............................ 201810284025

(51) Int. Cl.
*H04L 12/28* (2006.01)
*H04L 5/00* (2006.01)
(Continued)

(52) U.S. Cl.
CPC .......... *H04L 5/0044* (2013.01); *H04L 5/0092* (2013.01); *H04W 72/042* (2013.01); *H04W 72/0453* (2013.01)

(58) Field of Classification Search
CPC .... H04L 5/0064; H04L 5/0039; H04W 28/20; H04W 72/0453; H04W 72/04
(Continued)

(56) References Cited

U.S. PATENT DOCUMENTS

2012/0076024 A1 3/2012 Ko et al.
2016/0050647 A1 2/2016 Hwang et al.
(Continued)

FOREIGN PATENT DOCUMENTS

CN 101801093 A 8/2010
CN 103327615 A 9/2013
(Continued)

OTHER PUBLICATIONS

Fujitsu, "Discussion on frequency domain resource allocation," 3GPP TSG RAN WG1 #90b, R1-1717718, Prague, Czech Republic, Oct. 9-13, 2017, 4 pages.
(Continued)

*Primary Examiner* — John Pezzlo
(74) *Attorney, Agent, or Firm* — Fish & Richardson P.C.

(57) ABSTRACT

This application provides a method and apparatus for obtaining a resource indication value. The method includes: a network device determines a bit quantity of a resource indication value based on a first bandwidth part, sends downlink control information, which includes the resource indication value and indicates a data channel in a second bandwidth part, and sends or receives the data channel occupying a plurality of contiguous virtual resource blocks, wherein a number $RB_{start}$ identifying the starting virtual resource block of the contiguous virtual resource blocks, a quantity $L_{RBs}$ of the contiguous virtual resource blocks, and the resource indication value RIV satisfy following relation: $RB_{start}=\lfloor K \cdot RB'_{start} \rfloor$, and $L_{RBs}=\lfloor K \cdot L'_{RBs} \rfloor$, wherein K is a positive number and satisfies $K \leq \lfloor N_{RB}^{BWP2}/N_{RB}^{BWP1} \rfloor$, and
(Continued)

$N_{RB}^{BWP2}$ refers to a bandwidth of the second bandwidth part; and $RIV=N_{RB}^{BWP1}(L'_{RBs}-1)+RB'_{start}$ when $(L'_{RBs}-1) \leq \lfloor N_{RB}^{BWP1}/2 \rfloor$, or $RIV=N_{RB}^{BWP1}(N_{RB}^{BWP1}-L'_{RBs}+1)+(N_{RB}^{BWP1}-1-RB'_{start})$ when $(L'_{RBs}-1) > \lfloor N_{RB}^{BWP1}/2 \rfloor$, wherein $N_{RB}^{BWP1}$ refers to a bandwidth of the first bandwidth part.

12 Claims, 20 Drawing Sheets

Related U.S. Application Data continuation of application No. PCT/CN2019/081091, filed on Apr. 2, 2019.

(51) Int. Cl.
*H04W 72/04* (2023.01)
*H04W 72/0453* (2023.01)
*H04J 1/16* (2006.01)

(58) Field of Classification Search
USPC .................................. 370/252, 329, 430
See application file for complete search history.

(56) References Cited

U.S. PATENT DOCUMENTS

| | | | |
|---|---|---|---|
| 2017/0135105 | A1 | 5/2017 | Li et al. |
| 2018/0049169 | A1 | 2/2018 | Lin et al. |
| 2018/0049203 | A1 | 2/2018 | Xue et al. |
| 2019/0297605 | A1 | 9/2019 | Kim et al. |
| 2019/0306861 | A1* | 10/2019 | Li ................... H04L 5/0094 |
| 2020/0092864 | A1 | 3/2020 | Chen |
| 2020/0120680 | A1* | 4/2020 | Hwang ............ H04W 80/08 |
| 2021/0058940 | A1* | 2/2021 | Choi ............ H04W 72/0453 |

FOREIGN PATENT DOCUMENTS

| | | |
|---|---|---|
| CN | 105099634 | 11/2015 |
| CN | 105122861 | 12/2015 |
| CN | 107027183 A | 8/2017 |
| EP | 3242517 A1 | 11/2017 |
| WO | 2018030864 A1 | 2/2018 |

OTHER PUBLICATIONS

Office Action issued in Japanese Application No. 2020-553568 dated Nov. 9, 2021, 4 pages (with English translation).
3GPP TS 38.212 V15.0.0 (Dec. 2017), "3rd Generation Partnership Project; Technical Specification Group Radio Access Network; NR; Multiplexing and channel coding (Release 15)," Dec. 2017, 82 pages.
3GPP TS 38.214 V15.0.0 (Dec. 2017), "3rd Generation Partnership Project; Technical Specification Group Radio Access Network; NR; Physical layer procedures for data (Release 15)," Dec. 2017, 71 pages.
Ericsson, "Summary of 7.1.3.1.4 (DCI contents and formats)," 3GPP TSG-RAN WG1 #92, R1-1803232; Athens, Greece, Feb. 26-Mar. 2, 2018, 19 pages.
PCT International Search Report and Written Opinion issued in International Application No. PCT/CN2019/081091 dated Jun. 13, 2019, 13 pages (partial English translation).
Nokia, "On remaining details on BWPs," 3GPP TSG-RAN WG1 Meeting #92, R1-1802539; Athens, Greece, Feb. 26-Mar. 2, 2018, 8 pages.
Extended European Search Report issued in European Application No. 19781650.7 dated May 12, 2021, 9 pages.
Huawei, HiSilicon, "Remaining issues on resource allocation and TBS," 3GPP TSG RAN WG1 Ad Hoc Meeting, R1-1800019, Vancouver, Canada, Jan. 22-26, 2018, 16 pages.
Office Action issued in Indian Application No. 202037043854 dated Sep. 10, 2021, 7 pages.
Qualcomm Incorporated, "Remaining Issues on BWP," 3GPP TSG RAN WG1 Meeting #92, R1-1802844, Athens, Greece, Feb. 26-Mar. 2, 2018, 24 pages.
Office Action issued in Chinese Application No. 202011494650.8 dated Jun. 22, 2021, 5 pages.
Office Action issued in Chinese Application No. 202011497846.2 dated Jun. 22, 2021, 5 pages.
Office Action issued in Chinese Application No. 201810284025.7 dated Mar. 1, 2021, 8 pages.
Nokia, Nokia Shanghai Bell, "On remaining details of BWPs," 3GPP TSG-RAN WG1 Meeting NR1801, R1-1800552, Vancouver, Canada, Jan. 22-26, 2018, total 6 pages.
Office Action issued in Chinese Application No. 202011494650.8 dated Aug. 9, 2021, 4 pages.

* cited by examiner

METHOD AND APPARATUS FOR OBTAINING RESOURCE INDICATION VALUE

CROSS-REFERENCE TO RELATED APPLICATIONS

This application is a continuation of U.S. patent application Ser. No. 16/730,419, filed on Dec. 30, 2019, which is a continuation of International Application No. PCT/CN2019/081091, filed on Apr. 2, 2019, which claims priority to Chinese Patent Application No. 201810284025.7, filed on Apr. 2, 2018. All of the afore-mentioned patent applications are hereby incorporated by reference in their entireties.

TECHNICAL FIELD

This application relates to the communications field, and more specifically, to a method and apparatus for obtaining a resource indication value.

BACKGROUND

In a fifth-generation radio access system standard, namely, new radio (NR), a bandwidth part (BWP) in which a data channel scheduled by using downlink control information (DCI) is located may be different from a BWP in which the DCI is located. In this case, a quantity of bits required to indicate a frequency domain resource of the data channel scheduled by using the DCI may be different from a quantity of bits that can be carried in a frequency domain resource allocation (RA) field in the DCI. Therefore, a solution that can successfully interpret the frequency domain RA field in the DCI in this scenario needs to be designed.

In the prior art, a zero is usually padded before a most significant bit of a decoded frequency domain RA field in the DCI, so as to obtain a resource indication value (RIV) indicating a resource occupied by the data channel scheduled by using the DCI. There are a very small quantity of virtual resource blocks (VRB) corresponding to the RIV obtained in this manner and the quantity is of a very few types, and this greatly limits flexibility of scheduling a data channel by a network device. Therefore, a more optimized solution to interpreting a frequency domain RA field in DCI needs to be designed, so as to improve flexibility of scheduling a data channel by a network device.

SUMMARY

This application provides a method and apparatus for obtaining a resource indication value, so as to improve flexibility of scheduling a data channel by a network device.

According to a first aspect, a method for obtaining a resource indication value is provided, where the method includes: receiving downlink control information (DCI), where the DCI includes a resource indication value (RV) n, a quantity of bits of the first RIV n is determined based on a first bandwidth part (BWP), and the DCI is used to schedule a data channel located in a second BWP; determining a second RIV r based on the first RIV n, where $r = \lfloor \pm a \cdot n + b \rfloor$ or $r = \lfloor a \cdot n \rfloor$, a is a positive number, and b is a positive integer; and determining, based on the second RIV r, a resource occupied by the data channel.

Optionally, the determining, based on the second RIV r, a resource occupied by the data channel includes: determining, based on the second RIV r and a bandwidth $N_{RB}^{BWP2}$ of the second BWP, the resource occupied by the data channel.

Optionally, a is determined based on a bandwidth $N_{RB}^{BWP1}$ of the first BWP and the bandwidth $N_{RB}^{BWP2}$ of the second BWP.

Optionally, $a = 2^k$, $k = k2 - k1$, k2 is a quantity of bits required to indicate a frequency domain resource in the second BWP, and k1 is the quantity of bits of the first RIV n.

Optionally, k1 is determined based on the bandwidth $N_{RB}^{BWP1}$ of the first BWP, $k1 = \lceil \log_2 NN_{RB}^{BWP1}(N_{RB}^{BWP1}+1)/2 \rceil$, k2 is determined based on the bandwidth $N_{RB}^{BWP2}$ of the second BWP, and $k2 = \lceil \log_2 N_{RB}^{BWP2}(N_{RB}^{BWP2}+1)/2 \rceil$.

Optionally, k1 is determined based on the bandwidth $N_{RB}^{BWP1}$ of the first BWP and a quantity P1 of virtual resource blocks (VRB) included in a resource block group (RBG) in the first BWP, $k1 = \lceil N_{RB}^{BWP1}/P1 \rceil$, k2 is determined based on the bandwidth $N_{RB}^{BWP2}$ of the second BWP and $k2 = \lceil \log_2 N_{RB}^{BWP2}(N_{RB}^{BWP2}+1)/2 \rceil$.

Optionally, $a = 2^k$, $k = \lfloor \log_2(N/M) \rfloor$, M is a total quantity of statuses that can be represented by the quantity of bits of the first RIV n, and N is a total quantity of statuses required to indicate a frequency domain resource in the second BWP.

Optionally, $a = \lfloor N/M \rfloor$ or $a = N/M$, M is a total quantity of statuses that can be represented by the quantity of bits of the first RIV n, and N is a total quantity of statuses required to indicate a frequency domain resource in the second BWP.

Optionally, $M = 2^{k1}$, and k1 is the quantity of bits of the first RIV n.

Optionally, N is determined based on the bandwidth $N_{RB}^{BWP2}$ of the second BWP, and $N = N_{RB}^{BWP2}(N_{RB}^{BWP2}+1)/2$.

Optionally, N is determined based on the bandwidth $N_{RB}^{BWP2}$ of the second BWP and a scheduling granularity P2, and $N = \lfloor N_{RB}^{BWP2}/P2 \rfloor (\lfloor N_{RB}^{BWP2}/P2 \rfloor +1)/2$.

Optionally, when $r = \lfloor \pm a \cdot n + b \rfloor$, b meets one of the following: b is configured by using higher layer signaling; or b is determined based on a parameter configured for a terminal device.

Optionally, $b = n_{UE} \mod(\lfloor a \rfloor)$, and $n_{UE}$ is the parameter configured for the terminal device.

Optionally, when $r = \lfloor \pm a \cdot n + b \rfloor$, $b = -b1 + b2$, and b1 meets one of the following: b1 is configured by using higher layer signaling; or b1 is determined based on a parameter configured for the terminal device; and $b2 = N - 1$, and N is the total quantity of statuses required to indicate the frequency domain resource in the second BWP.

According to a second aspect, a method for obtaining a resource indication value is provided, where the method includes: determining a second resource indication value (RIV) r, where the second RIV r is used to indicate a resource occupied by a data channel located in a second bandwidth part (BWP), and a quantity of bits required for the second RIV r is determined based on the second BWP; determining a first RIV n based on the second RIV r, where $r = \lfloor \pm a \cdot n + b \rfloor$ or $r = \lfloor a \cdot n \rfloor$, a is a positive number, and b is a positive integer; and sending downlink control information (DCI), where the DCI includes the first RIV n, and the DCI is used to schedule the data channel located in the second BWP.

Optionally, the determining a second resource indication value (RIV) r includes: determining the second RIV r based on a bandwidth $N_{RB}^{BWP2}$ of the second BWP.

Optionally, a is determined based on a bandwidth $N_{RB}^{BWP1}$ of a first BWP and the bandwidth $N_{RB}^{BWP2}$ of the second BWP.

Optionally, $a = 2^k$, $k = k2 - k1$, k2 is a quantity of bits required to indicate a frequency domain resource in the second BWP, and k1 is a quantity of bits of the first RIV n.

Optionally, k1 is determined based on the bandwidth $N_{RB}^{BWP1}$ of the first BWP, $k1=\lceil \log_2 N_{RB}^{BWP1}(N_{RB}^{BWP1}+1)/2 \rceil$, k2 is determined based on the bandwidth $N_{RB}^{BWP2}$ of the second BWP, and $k2=\lceil \log_2 N_{RB}^{BWP2}(N_{RB}^{BWP2}+1)/2 \rceil$.

Optionally, k1 is determined based on the bandwidth $N_{RB}^{BWP1}$ of the first BWP and a quantity P1 of virtual resource blocks (VRB) included in a resource block group (RBG) in the first BWP, $k1=\lceil N_{RB}^{BWP1}/P1 \rceil$, k2 is determined based on the bandwidth $N_{RB}^{BWP2}$ of the second BWP, and $k2=\lceil \log_2 N_{RB}^{BWP2}(N_{RB}^{BWP2}+1)/2 \rceil$.

Optionally, $a=2^k$, $k=\lfloor \log_2(N/M) \rfloor$, M is a total quantity of statuses that can be represented by a quantity of bits of the first RIV n, and N is a total quantity of statuses required to indicate a frequency domain resource in the second BWP.

Optionally, $a=\lfloor N/M \rfloor$ or $a=N/M$, M is a total quantity of statuses that can be represented by a quantity of bits of the first RIV n, and N is a total quantity of statuses required to indicate a frequency domain resource in the second BWP.

Optionally, $M=2^k$, and k1 is the quantity of bits of the first RIV n.

Optionally, N is determined based on the bandwidth $N_{RB}^{BWP2}$ of the second BWP, and $N=N_{RB}^{BWP2}(N_{RB}^{BWP2}+1)/2$.

Optionally, N is determined based on the bandwidth $N_{RB}^{BWP2}$ of the second BWP and a scheduling granularity P2, and $N=\lfloor N_{RB}^{BWP2}/P2 \rfloor(\lfloor N_{RB}^{BWP2}/P2 \rfloor+1)/2$.

Optionally, when $r=\lfloor \pm a \cdot n+b \rfloor$, b meets one of the following: b is configured by using higher layer signaling: or b is determined based on a parameter configured for a terminal device.

Optionally, $b=n_{UE} \mod(\lfloor a \rfloor)$, and $n_{UE}$ is the parameter configured for the terminal device.

Optionally, when $r=\lfloor \pm a \cdot n+b \rfloor$, $b=-b1+b2$, and b meets one of the following: b1 is configured by using higher layer signaling; or b1 is determined based on a parameter configured for the terminal device; and $b2=N-1$, and N is the total quantity of statuses required to indicate the frequency domain resource in the second BWP.

According to a third aspect, a method for obtaining a resource indication value is provided, where the method includes: receiving downlink control information (DCI), where the DCI includes a resource indication value (RIV), a quantity of bits of the RIV is determined based on a first bandwidth part (BWP), and the DCI is used to schedule a data channel located in a second BWP: and determining, based on the RIV and a bandwidth of the first BWP, a resource occupied by the data channel.

Optionally, the determining, based on the RIV and a bandwidth of the first BWP, a resource occupied by the data channel includes: determining a first number V1 and a first length L1 based on the RIV and the bandwidth $N_{RB}^{BWP1}$ of the first BWP; determining a second number V2 based on the first number V1 and an offset value; and determining, based on the second number V2 and the first length L1, the resource occupied by the data channel.

Optionally, the determining, based on the RIV and a bandwidth of the first BWP, a resource occupied by the data channel includes: determining a first number V1 and a first length L1 based on the RIV and the bandwidth $N_{RB}^{BWP1}$ of the first BWP; determining a second number V2 based on the first number V1, where $V2=\lfloor K \cdot V1+n_{offset} \rfloor$; determining a second length L2 based on the first length L1, where $L2=\lfloor K \cdot L1 \rfloor$, and K is a positive number: and determining, based on the second number V2 and the second length L2, the resource occupied by the data channel.

Optionally, K is determined based on the bandwidth $N_{RB}^{BWP1}$ of the first BWP and a bandwidth $N_{RB}^{BWP2}$ of the second BWP, and $K=N_{RB}^{BWP2}/N_{RB}^{BWP1}$.

Optionally, K=1.

Optionally, the offset value $n_{offset}$ is configured by using higher layer signaling, or the offset value $n_{offset}$ is a difference between a frequency domain starting position of the first BWP and a frequency domain starting position of the second BWP.

According to a fourth aspect, a method for obtaining a frequency domain resource indication value is provided, including: receiving downlink control information (DCI), where the DCI includes frequency domain resource allocation information, a quantity of bits of the frequency domain resource allocation information is determined based on a first bandwidth part (BWP), and the DCI is used to schedule a data channel located in a second BWP; changing a resource block group (RBG) configuration of the second BWP and increasing a granularity of an RBG of the second BWP when the quantity k1 of bits of the frequency domain resource allocation information is less than a quantity k2 of bits required to indicate a frequency domain resource in the second BWP; and determining, based on the frequency domain resource allocation information, a resource occupied by the data channel.

Optionally, the increasing a granularity of an RBG of the second BWP includes: changing the resource block group (RBG) configuration of the second BWP to a second RBG configuration when the RBG configuration of the second BWP is a first RBG configuration.

Optionally, the increasing a granularity of an RBG of the second BWP when the quantity k1 of bits of the frequency domain resource allocation information is less than a quantity k2 of bits required to indicate a frequency domain resource in the second BWP includes: when the quantity k1 of bits of the frequency domain resource allocation information is less than the quantity k2 of bits required to indicate the frequency domain resource in the second BWP, and the granularity of the RBG of the second BWP is not a maximum value, increasing the granularity of the RBG of the second BWP.

Optionally, k1 is determined based on a bandwidth $N_{RB}^{BWP1}$ of the first BWP, $k1=\lceil \log_2 N_{RB}^{BWP1}(N_{RB}^{BWP1}+1)/2 \rceil$, k2 is determined based on a bandwidth $N_{RB}^{BWP2}$ of the second BWP and a quantity P2 of VRBs included in the RBG of the second BWP, and $k2=\lceil N_{RB}^{BWP2}/P2 \rceil$.

Optionally, k1 is determined based on a bandwidth $N_{RB}^{BWP1}$ of the first BWP and a quantity P1 of VRBs included in an RBG of the first BWP, $k1=\lceil N_{RB}^{BWP1}/P1 \rceil$, k2 is determined based on a bandwidth $N_{RB}^{BWP2}$ of the second BWP, and $k2=\lceil N_{RB}^{BWP2}/P2 \rceil$.

According to a fifth aspect, a method for obtaining a frequency domain resource indication value is provided, including: determining frequency domain resource allocation information, where the frequency domain resource allocation information is used to indicate a resource occupied by a data channel located in a second bandwidth part (BWP), and a quantity of bits required for the frequency domain resource allocation information is determined based on the second BWP; changing a resource block group (RBG) configuration of the second BWP and increasing a granularity of an RBG of the data channel of the second BWP when the quantity k1 of bits of the frequency domain resource allocation information is less than a quantity k2 of bits required to indicate a frequency domain resource in the second BWP; and sending downlink control information (DCI), where the DCI includes the frequency domain resource allocation information, and the DCI is used to schedule the data channel located in the second BWP.

Optionally, the increasing a granularity of an RBG of the second BWP includes: changing the resource block group (RBG) configuration of the second BWP to a second RBG configuration when the RBG configuration of the second BWP is a first RBG configuration.

Optionally, k1 is determined based on a bandwidth $N_{RB}^{BWP1}$ of the first BWP, $k1=\lceil \log_2 N_{RB}^{BWP1}(N_{RB}^{BWP1}+1)/2 \rceil$, k2 is determined based on a bandwidth $N_{RB}^{BWP2}$ of the second BWP and a quantity P2 of VRBs included in the RBG of the second BWP, and $k2=\lceil N_{RB}^{BWP2}/P2 \rceil$.

Optionally, k1 is determined based on a bandwidth $N_{RB}^{BWP1}$ of the first BWP and a quantity P1 of VRBs included in an RBG of the first BWP, $k1=\lceil N_{RB}^{BWP1}/P1 \rceil$, k2 is determined based on a bandwidth $N_{RB}^{BWP2}$ of the second BWP, and $k2=\lceil N_{RB}^{BWP2}/P2 \rceil$.

According to a sixth aspect, a method for obtaining a frequency domain resource indication value is provided, where the method includes: receiving downlink control information (DCI), where the DCI includes frequency domain resource allocation information, a quantity of bits of the frequency domain resource allocation information is determined based on a first bandwidth part (BWP), and the DCI is used to schedule a data channel located in a second BWP; determining a resource indication value (RIV) r based on the frequency domain resource allocation information, where the RIV r meets $r=\lfloor \pm a \cdot n+b \rfloor$ or $r=\lfloor a \cdot n \rfloor$, a is a positive number, b is a positive integer, and n is a value corresponding to the frequency domain resource allocation information; and determining, based on the RIV r, a resource occupied by the data channel.

According to a seventh aspect, a method for obtaining a resource indication value is provided, where the method includes: determining a resource indication value (RIV) r, where the RIV r is used to indicate a resource occupied by a data channel located in a second bandwidth part (BWP), and a quantity of bits required for the RIV r is determined based on the second BWP: determining frequency domain resource allocation information n based on the RIV r, where $r=\lfloor \pm a \cdot n+b \rfloor$ or $r=\lfloor a \cdot n \rfloor$, a is a positive number, and b is a positive integer: and sending downlink control information (DCI), where the DCI includes the frequency domain resource allocation information n, and the DCI is used to schedule the data channel located in the second BWP.

According to an eighth aspect, an apparatus for obtaining a resource indication value is provided, where the apparatus may be a communications device (for example, a terminal device or a network device), or may be a chip inside a communications device. The apparatus may include a processing unit and a transceiver unit. When the apparatus is a communications device, the processing unit may be a processor, and the transceiver unit may be a transceiver. The communications device may further include a storage unit, and the storage unit may be a memory. The storage unit is configured to store an instruction. The processing unit executes the instruction stored in the storage unit, so that the communications device performs the method in any one of the first aspect to the seventh aspect and the optional implementations thereof. When the apparatus is a chip inside a communications device, the processing unit may be a processor, and the transceiver unit may be an input/output interface, a pin, a circuit, or the like. The processing unit executes an instruction stored in a storage unit, so that the communications device performs the method in any one of the first aspect to the seventh aspect and the optional implementations thereof. The storage unit may be a storage unit (such as a register or a cache) inside the chip, or may be a storage unit (such as a read-only memory or a random access memory) inside the communications device and outside the chip.

According to a ninth aspect, an apparatus for obtaining a resource indication value is provided, where the apparatus includes a memory and a processor, the memory stores an instruction, and when the instruction is run by the processor, the apparatus performs the method in any one of the first aspect to the seventh aspect and the optional implementations thereof. The apparatus may be a chip or a chip system.

According to a tenth aspect, a chip or a chip system is provided, including a memory and a processor. The memory is configured to store a computer program, and the processor is configured to invoke the computer program from the memory and run the computer program, so that a communications device (such as a terminal device or a network device) on which the chip or the chip system is installed performs the method in any one of the first aspect to the seventh aspect and the optional implementations thereof.

According to an eleventh aspect, a computer program product is provided, and the computer program product includes computer program code. When the computer program code is run by a transceiver unit, a processing unit, a transceiver, or a processor of a communications device (such as a terminal device or a network device), the communications device performs the method in any one of the first aspect to the seventh aspect and the optional implementations thereof.

According to a twelfth aspect, a computer-readable storage medium is provided. The computer-readable storage medium stores a program. The program enables a communications device (such as a terminal device or a network device) to perform the method in any one of the first aspect to the seventh aspect and the optional implementations thereof.

According to a thirteenth aspect, a network system is provided, where the network system includes the terminal device in the eighth aspect and the network device in the eighth aspect.

DESCRIPTION OF EMBODIMENTS

Figure 1:
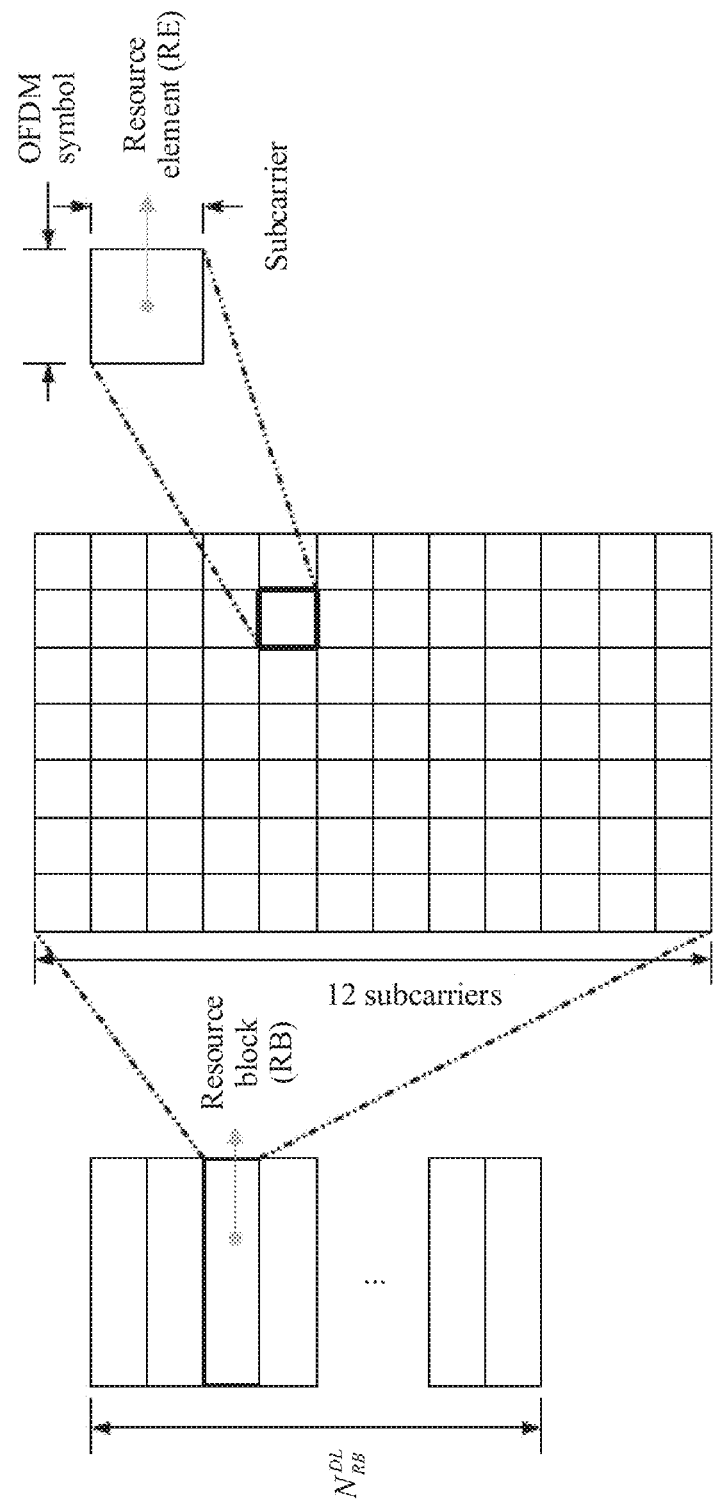
FIG. 1 is a schematic diagram of a downlink time-frequency resource grid.

In a fifth-generation radio access system standard, namely, new radio (NR), a basic unit in frequency domain is one subcarrier, and a subcarrier spacing may be 15 KHz, 30 KHz, or the like. At an NR physical layer, a unit of an uplink/downlink frequency domain resource is a physical resource block (PRB), and each PRB includes 12 contiguous subcarriers in frequency domain. FIG. 1 shows a downlink time-frequency resource grid. As shown in FIG. 1, each element in the resource grid is referred to as a resource element (RE), and the RE is a minimum physical resource and includes one subcarrier in one orthogonal frequency division multiplexing (OFDM) symbol. An uplink time-frequency resource grid is similar to the downlink time-frequency resource grid. A basic time unit of uplink/downlink resource scheduling in NR is one slot. Usually, one slot includes 14 OFDM symbols in time domain.

Figure 2:
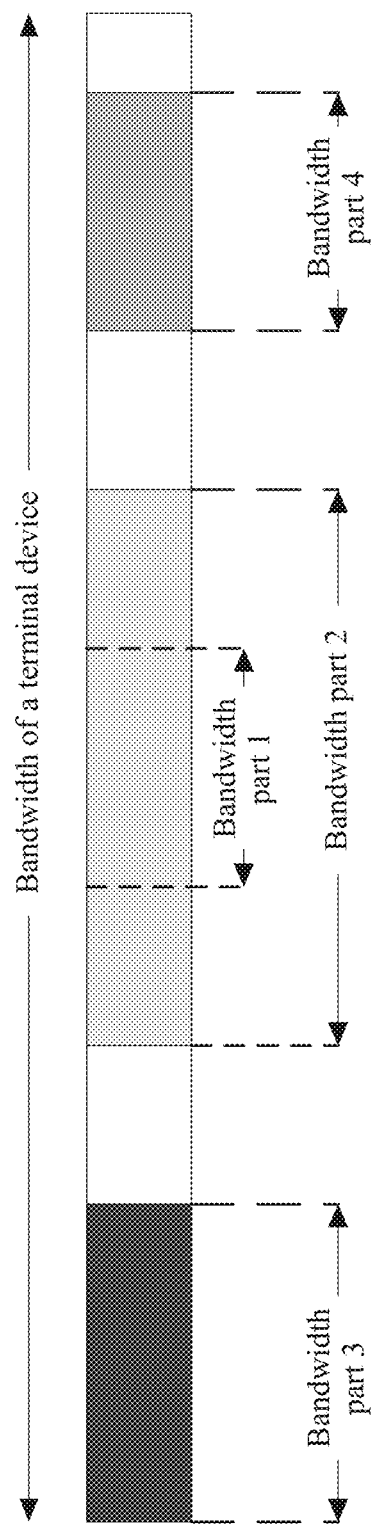
FIG. 2 is a schematic diagram of a bandwidth part of a terminal device.

A network device may configure one or more uplink/downlink bandwidth parts (BWP) for a terminal device, where the BWP includes contiguous PRBs in frequency domain, and the BWP is one subset in a bandwidth of the terminal device. A minimum granularity of the BWP in frequency domain is one PRB. The network device may configure one or more BWPs for the terminal device, and as shown in FIG. 2, the plurality of BWPs may overlap in frequency domain.

The network device may activate one uplink/downlink BWP of the configured bandwidth parts for the terminal device, and send a physical downlink shared channel (PDSCH) and a physical downlink control channel (PDCCH) to the terminal device in the activated downlink BWP. The terminal device sends a physical uplink shared channel (PUSCH) and a physical uplink control channel (PUCCH) to the network device in the activated uplink BWP. To correctly receive a PDSCH or send a PUSCH, the terminal device needs to first demodulate a PDCCH. Downlink control information (DCI) carried on the PDCCH includes information that can indicate a frequency domain position of a PRB used by the PDSCH/PUSCH in a BWP, namely, uplink/downlink frequency domain resource allocation (RA) information.

In NR, a frequency domain RA information field in DCI is used to indicate uplink/downlink frequency domain RA information, and a size of the information field (namely, a quantity of used bits) depends on a corresponding bandwidth of a BWP and a corresponding frequency domain RA type. Currently, in an NR system, two frequency domain RA types are used: a type 0 and a type 1. The solutions in this patent are mainly for the type 1.

Figure 3:
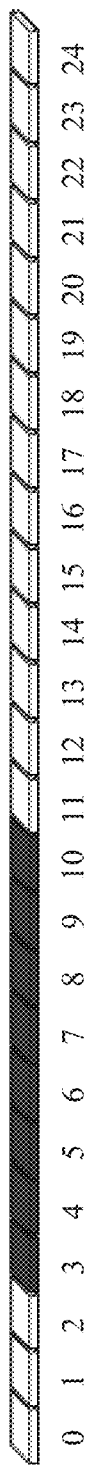
FIG. 3 is a schematic diagram of a virtual resource block of a terminal device.

For a frequency domain RA type 1, a virtual resource block (VRB) is defined in NR. The VRB is a logical concept. The network device numbers a PRB in a BWP of the terminal device. There is a correspondence between a number of each PRB and a number of one VRB. The network device indicates, in a frequency domain RA information field, a VRB number corresponding to an allocated PRB resource to the terminal device. The terminal device obtains a number of the allocated PRB resource (for example, a number of the PRB resource in the BWP) based on a mapping relationship between a number of a VRB and a number of a PRB, so as to obtain a frequency domain position of the allocated PRB in the BWP. To be specific, frequency domain resource information of the PDSCH/PUSCH is represented by a number of an allocated VRB, and the terminal device maps the number of the VRB to a corresponding PRB number. For the frequency domain RA type 1, frequency domain RA information is a resource indication value (RIV) indicated by an RA information field, and the RIV is used to indicate a series of contiguous VRB numbers to the terminal device. Usually, the terminal device may derive a starting VRB number (represented by $RB_{start}$) and a quantity of contiguously numbered VRBs (represented by $L_{RBs}$) by using this value and a bandwidth (however, may be alternatively a bandwidth of another BWP) of the BWP in which the PDSCH/PUSCH is located. For example, a bandwidth of a BWP is 25 RBs. As shown in FIG. 3, for a series of contiguous VRB numbers from 3 to 10, a starting VRB number is 3, and a quantity of contiguously numbered VRBs is 8. The frequency domain RA type 1 has relatively small DCI overheads.

In an existing NR standard, a value of an RIV is determined in the following manner: When $(L_{RBs}-1) \le \lfloor N_{BWP}^{size}/2 \rfloor$, $RIV = N_{BWP}^{size}(L_{RBs}-1) + RB_{start}$. Otherwise, $RIV = N_{BWP}^{size}(N_{BWP}^{size} - L_{RBs} + 1) + (N_{BWP}^{size} - 1 - RB_{start})$.

Herein, $L_{RBs} \ge 1$, $L_{RBs}$ does not exceed $N_{BWP}^{size} - RB_{start}$, and $N_{BWP}^{size}$ is a bandwidth of a BWP, namely, a quantity of PRBs included in the BWP. Therefore, the RIV ranges from 0 to $\frac{1}{2}N_{BWP}^{size}(N_{BWP}^{size}+1)-1$, and a quantity of bits required for a frequency domain RA information field indicating the RIV is $\lceil \log_2 N_{BWP}^{size}(N_{BWP}^{size}+1)/2 \rceil$.

For ease of understanding, a formula for calculating the RIV in the frequency domain RA type 1 is represented by using a dendrogram, to be specific, a dendrogram with a depth of $N_{BWP}^{size}$ and a bottom-most layer having $N_{BWP}^{size}$ nodes is constructed, and each node in the dendrogram is numbered, where each node number corresponds to one RIV. Therefore, the node number ranges from 0 to $\frac{1}{2} N_{BWP}^{size}(N_{BWP}^{size}+1)-1$. Each node at the bottom-most layer corresponds to one VRB number, and a number of each node except a node at the bottom-most layer corresponds to a group of nodes at the bottom-most layer. A value indicated by frequency domain RA indication information is a number (namely, an RIV) of a node in the dendrogram, the node corresponds to a group of nodes at the bottom-most layer, and VRB numbers corresponding to the group of nodes at the bottom-most layer are a VRB set indicated by the frequency domain RA indication information.

Figure 4:
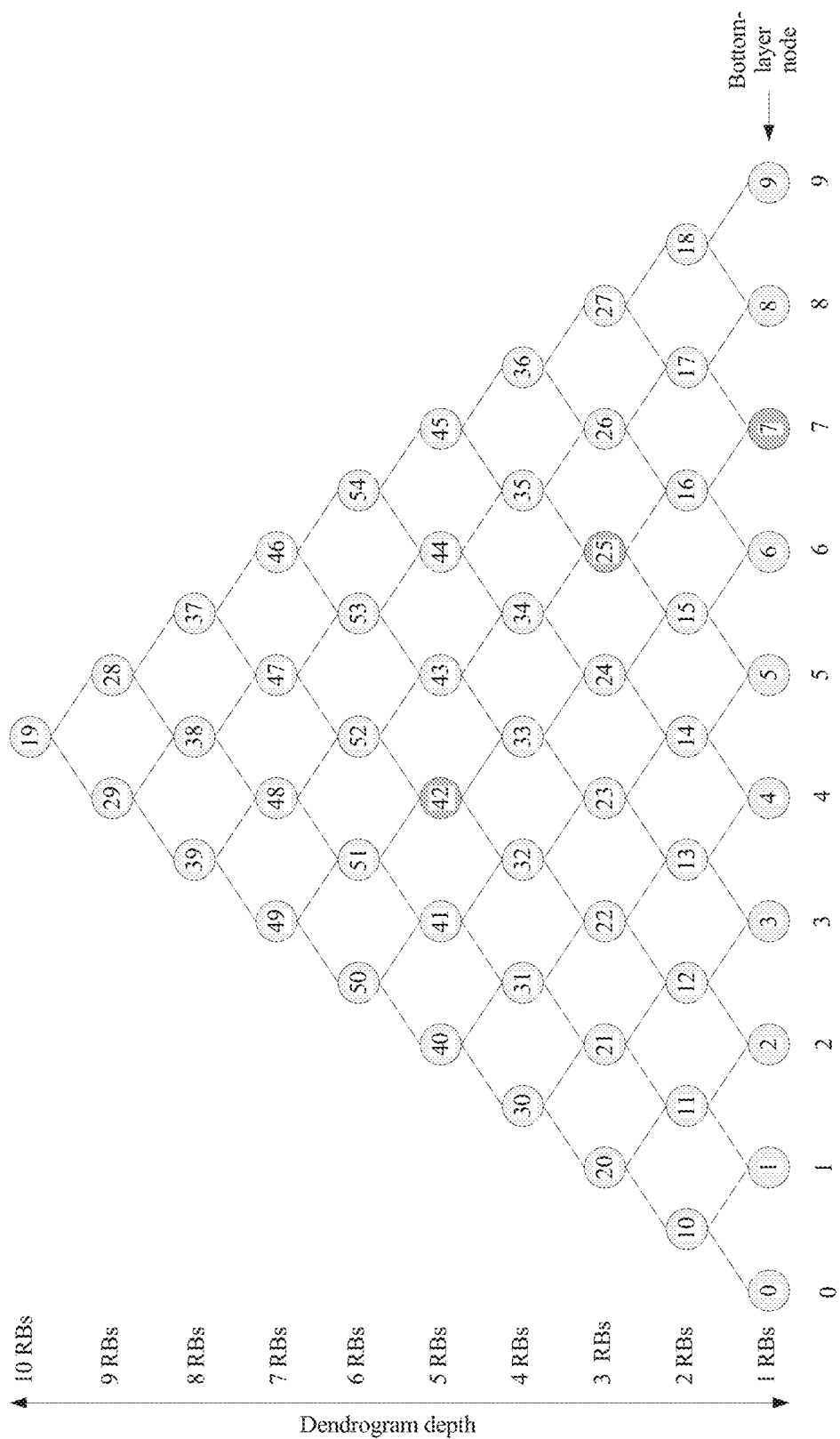
FIG. 4 is a schematic diagram of a dendrogram representing a correspondence between a resource indication value and a virtual resource block.

For convenience, for example, a bandwidth is 10 PRBs. A dendrogram with a depth of 10 and a bottom-most layer having 10 nodes is constructed. In the constructed dendrogram, as shown in FIG. 4, each node is numbered according to the foregoing RIV generation formula. For 10 PRBs, the RIV ranges from 0 to $\frac{1}{2} \cdot 10(10+1)-1=54$, and a quantity of bits required for a frequency domain RA information field is $\lceil \log_2 10(10+1)/2 \rceil=6$ bits. When a bit status value of the field is "101010", a corresponding RIV is "42", a corresponding node is a node numbered 42 in the diagram, and nodes at the bottom-most layer that are corresponding to the node numbered 42 are numbered $\{2, 3, 4, 5, 6\}$, and further correspond to VRBs numbered $\{2, 3, 4, 5, 6\}$. To be specific, $RB_{start}=2$, and $L_{RBs}=5$. Similarly, if a number indicated by the RIV is 7, the RIV corresponds to a VRB numbered 7. If a number indicated by the RIV is 26, nodes at the bottom-most layer that are corresponding to the number 26 are numbered $\{6, 7, 8\}$, and therefore the RIV correspond to VRBs numbered $\{6, 7, 8\}$. In this way, one number in the dendrogram corresponds to a set of contiguously numbered VRBs, so as to implement frequency domain RA. It can also be learned that a number of a layer at which each node in the dendrogram is located indicates a quantity of scheduled VRBs, namely, a value of $L_{RBs}$.

NR proposes a concept of a control resource set (CORESET). The network device configures one or more CORESETs for each downlink BWP of each terminal device, and sends a PDCCH to the terminal device on any control resource set configured for the terminal device. Each CORESET includes PRBs in frequency domain and contiguous OFDM symbols in time domain. Search space is configured in each CORESET. The search space may be classified into common search space (CSS) and terminal device specific search space (USS). The terminal device blindly detects a PDCCH in corresponding search space.

As described above, a size of a frequency domain RA information field in DCI depends on a bandwidth of a corresponding BWP. Usually, a BWP in which a PDSCH/PUSCH scheduled by using the DCI is located is the same as a BWP that determines the size of the frequency domain RA information field in the DCI. However, in some specific scenarios, the two BWPs are inconsistent, and bandwidths of the two BWPs may be different. The following uses an example to describe these scenarios.

Scenario 1: DCI is Used to Trigger BWP Switching to Perform Cross-BWP Scheduling.

Figure 5:
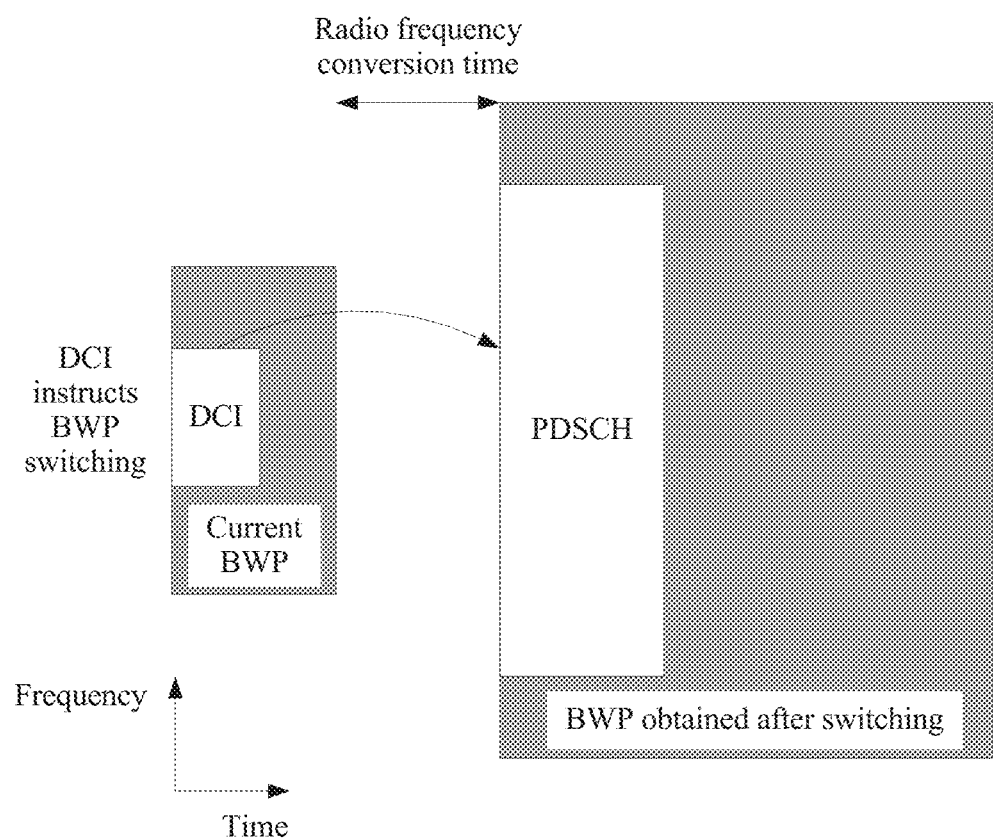
FIG. 5 is a schematic diagram of switching a bandwidth part of a terminal device.

As shown in FIG. 5, PDSCH transmission is used as an example, DCI is located in a current BWP, and a size of a frequency domain RA information field in the DCI is determined by a bandwidth of the current BWP. The DC includes a BWP indication information field, used to indicate a BWP activated by the terminal device. When the BWP indicated by the information field is inconsistent with a number of a BWP (namely, a current BWP for transmitting the DCI) currently activated by the terminal device, the terminal device needs to switch from the current BWP to the BWP indicated by the information field (namely, a BWP obtained after the switching). In addition, a PDSCH scheduled by using the DCI is transmitted in the BWP obtained after the switching, in other words, is scheduled across BWPs. Usually, a bandwidth of the current BWP is different from that of the BWP obtained after the switching.

Scenario 2: An Active BWP Includes an Initial BWP.

A downlink is used as an example. As shown in FIG. 5, an initial BWP is completely covered in a frequency domain resource range of a BWP activated by the terminal device. The initial BWP is used for system information transmission, random access, and paging. A CORESET transmitted in the initial BWP is referred to as a CORESET 0. A type of search space in the CORESET 0 is "CSS". A CORESET transmitted in the active BWP of the UE is a CORESET 1, and types of search space in the CORESET 1 are "CSS" and "USS". Therefore, in the active BWP, the terminal device needs to simultaneously receive DCI carried on PDCCHs transmitted by using the CORESETs in the active BWP and the initial BWP.

In NR, DCI is classified into several different DCI formats. For a BWP, each DCI format corresponds to a specific information size and use. Table 1 below shows types of DCI formats that may be transmitted in the active BWP, a type of search space in which each DCI format is transmitted, and a possible size of each DCI format in the case in FIG. 5.

TABLE 1

Types and sizes of DCI formats and search space in which a DCI format is located

| DCI format | Size |  |  |  |  |  |
| --- | --- | --- | --- | --- | --- | --- |
|  | 1 | 2 | 3 | 4 (Active BWP) | 5 (Active BWP) | 6 (Active BWP) |
| 0-0 | CSS |  |  | CSS, USS |  |  |
| 0-1 |  |  |  |  | USS |  |
| 1-0 | CSS |  |  | CSS, USS |  |  |
| 1-1 |  |  |  |  |  | USS |
| 2-0 |  | CSS |  |  |  |  |
| 2-1 |  |  | CSS |  |  |  |
| 2-2 | CSS |  |  |  |  |  |
| 2-3 | CSS |  |  |  |  |  |

For the DCI format 0-0/1-0, usually, sizes of the two DCI formats transmitted in a same BWP are the same. The DCI format 0-0 is used to schedule a PUSCH, and the DCI format 1-0 is used to schedule a PDSCH. In NR, a size of the DCI format 0-0/1-0 transmitted in the initial BWP is determined by the initial BWP. In a scenario shown in FIG. 5, both DCI formats carried on PDCCHs transmitted in the CORESETs of the active BWP and the initial BWP are 0-0/1-0, and each of sizes of the DCI formats 0-0/1-0 transmitted in the CORESETs of the two BWPs is determined by a corresponding BWP. Therefore, the DCI format 0-0/1-0 may have two types of sizes. It can be learned from the table that in this scenario, there are six types of sizes of DCI blindly detected by the UE. In a conclusion of the NR standard, to reduce a quantity of times the terminal device blindly detects a PDCCH, a maximum quantity of types of sizes of DCI blindly detected by the terminal device is 4, and DCI of a maximum of three types of sizes is scrambled by using a cell radio network temporary identifier (C-RNTI). In the table, each of the four DCI formats 0-0, 0-1, 1-0, and 1-1 may be scrambled by using a C-RNTI, the DCI format 0-1/1-1 may have two different DCI sizes, and the DCI format 0-0/1-0 may have two different DCI sizes. Therefore, DCI of four types of sizes may be scrambled by using a C-RNTI.

To reduce types of sizes of DCI blindly detected by the terminal device, a possible solution is that in this scenario, sizes of all DCI formats 0-0/1-0 transmitted in the active BWP are determined by the initial BWP. In this case, a size of the DCI format 0-0/1-0 transmitted in the CORESET 1 of the active BWP is determined by the initial BWP. For PDSCH transmission, a size of a frequency domain RA information field in the DCI format 1-0 is determined by a bandwidth of the initial BWP, and these PDSCHs scheduled by using the DCI may be transmitted in a frequency domain range of the active BWP.

Figure 6:
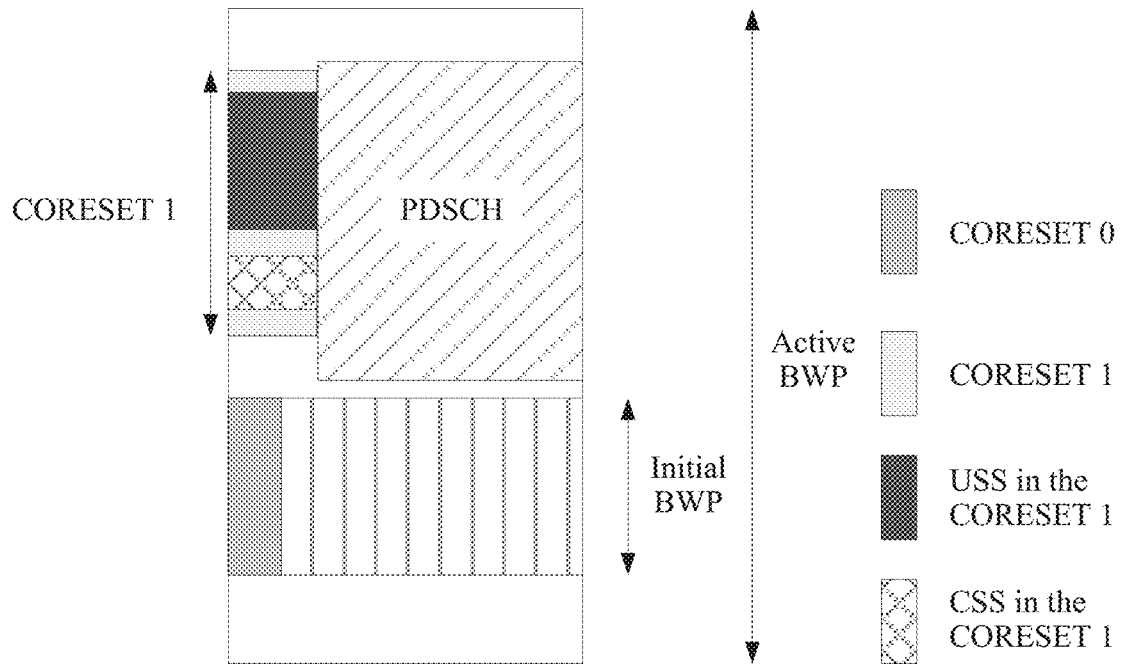
FIG. 6 is a schematic diagram of activating a bandwidth part of a terminal device.

It may be learned that a common point of the two scenarios is that a BWP in which a PDSCH/PUSCH scheduled by using DCI is located is different from a BWP for determining a size of a frequency domain RA information field in the DCI, and bandwidths of the two BWPs may be different. In FIG. 6, that a PDSCH is transmitted is used as an example to summarize the foregoing two scenarios, where a BWP 1 is a BWP for determining a size of a frequency domain RA information field in DCI, and a BWP 2 is a BWP in which a PDSCH scheduled by using the DCI is located.

For the frequency domain RA type 1, a bandwidth of a BWP in which a PDSCH scheduled by using DCI is located is greater than a bandwidth of a BWP for determining a size of a frequency domain RA field in the DCI (it is assumed that frequency domain types of the two BWPs are the type 1). FIG. 6 is still used as an example. A bandwidth of the BWP 1 for determining a size of a frequency domain RA information field in DCI is $N_{RB}^{BWP1}$=4RBs. Therefore, a quantity of bits of the frequency domain RA information field in the DCI is p1=$\lceil \log_2 N_{RB}^{BWP1}(N_{RB}^{BWP1}+1)/2 \rceil$=4 bits, and a value range of a value n1 of the information field is [0, 15]. A bandwidth of the BWP 2 in which a PDSCH scheduled by using the DCI is located is $N_{RB}^{BWP2}$=10RBs, and an RIV ranges from 0 to $\frac{1}{2}N_{RB}^{BWP2}(N_{RB}^{BWP2}+1)-1$=54. Therefore, a quantity of bits required to interpret all possible RIVs is p2=$\lceil \log_2 N_{RB}^{BWP2}(N_{RB}^{BWP2}+1)/2 \rceil$=6 bits, and a range of a value n2 of the quantity of bits is [0, 63]. In this case, the quantity of bits of the frequency domain RA information field in the DCI is less than the quantity of bits required to interpret the RIV. Therefore, a solution to interpreting the frequency domain RA information field in the DCI needs to be designed.

In the prior-art solution, the terminal device pads k 0s before a most significant bit of a decoded frequency domain RA information field in the DCI, to be specific, obtains an RIV after the 0s are padded before the most significant bit, and k is a difference between the quantity of bits required to interpret the RIV and the quantity of bits of the frequency domain RA information field. FIG. 6 is still used as an example. When a value of the frequency domain RA information field is "1011", k=2 0s are padded before the most significant bit of the field, and an obtained value of an RIV is "001011", namely, a decimal number 11.

Figure 7:
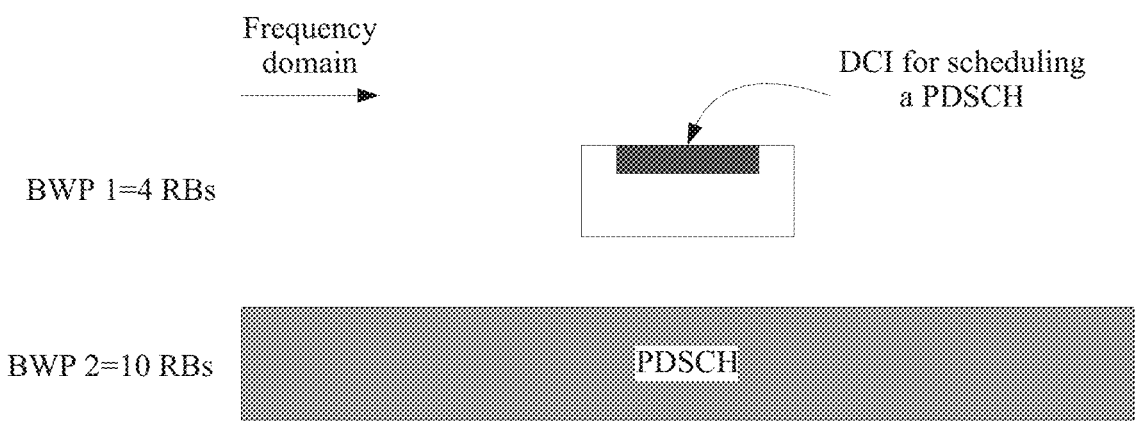
FIG. 7 is a schematic diagram of bandwidth parts with different bandwidths.
Figure 8:
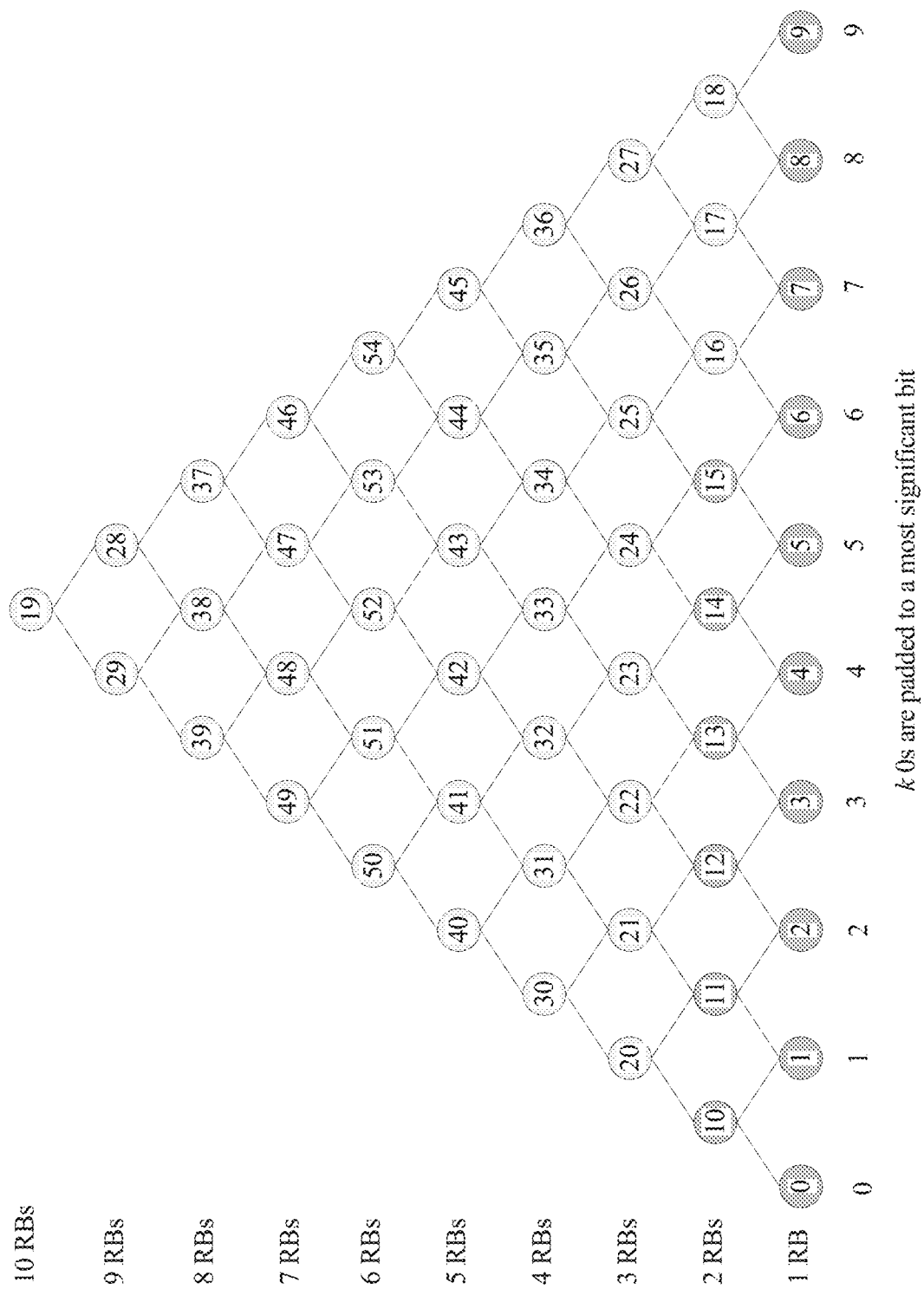
FIG. 8 is a schematic diagram of a dendrogram representing a correspondence between a resource indication value and a virtual resource block according to a prior-art solution.

A case shown in FIG. 7 is used as an example. When a value of an RIV is obtained by using the foregoing prior-art solution, as shown in FIG. 8, a value range of the RIV is represented by a colored node in a dendrogram. It can be learned that obtained values of RIVs are concentrated in contiguous and relatively small values (0 to 15). There are a very small quantity of VRBs corresponding to these RIVs, and there are a very few types (or granularities) of the quantity of these VRBs. This greatly limits flexibility of scheduling a data channel by a network device.

Therefore, another solution to interpreting an information field when a BWP in which a data channel scheduled by using DC is located is different from a BWP for determining a size of a frequency domain RA information field in the DCI needs to be designed. The following describes technical solutions of this application with reference to accompanying drawings.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on a signal having one or more data packets (for example, data from two components interacting with another component in a local system, a distributed system, and/or across a network such as the Internet interacting with other systems by using the signal).

It should be understood that embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, a universal mobile telecommunications system (UMTS), a wireless local area network (WLAN), a wireless fidelity (Wi-Fi) system, or a next-generation communications system. Herein, for example, the next-generation communications system may include a fifth-generation (5G) communications system.

Usually, a conventional communications system supports a limited quantity of connections and is easy to implement. However, with development of communications technologies, a mobile communications system not only supports conventional communication but also supports, for example, device to device (D2D) communication, machine to machine (M2M) communication, machine type communication (MTC), and vehicle to vehicle (V2V) communication.

The communication method in this application may be applied to communication between a network device and a terminal device.

As an example instead of a limitation, in the embodiments of this application, a terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a WLAN, or may be a cellular phone, a cordless phone, a Session Initiation Protocol (SIP) phone, a wireless local loop (WLL) station, a personal digital assistant (PDA) device, a handheld device having a wireless communication function, a computing device, another processing device connected to a wireless modem, an in-vehicle device, a wearable device, or a terminal device in a network in a next-generation communications system, for example, a terminal device in a 5G network or a terminal device in a future evolved public land mobile network (PLMN).

As an example instead of a limitation, in the embodiments of this application, the terminal device may be alternatively a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or be integrated into clothes or an accessory of a user. The wearable device is not merely a hardware device, and is further used to implement a powerful function through software support, data interaction, and cloud interaction. Generalized wearable intelligent devices include full-featured and large-size devices that can implement complete or partial functions without depending on smartphones, such as smartwatches or smart glasses, and devices that focus on only one type of application and need to work with other devices such as smartphones, such as various smart bands or smart jewelry for monitoring physical signs.

Alternatively, in the embodiments of this application, the terminal device may be a terminal device in an Internet of THings (IoT) system. IoT is an important composition part of information technology development in the future, and has a main technical feature in which things are connected to a network by using a communications technology to implement a man-machine connected and thing-thing connected intelligent network.

The network device may be a device configured to communicate with a mobile device, for example, a network device. The network device may be an access point (AP) in a WLAN, or a base transceiver station (BTS) in GSM or CDMA; or may be a NodeB (NB) in WCDMA, or a gNB in a new radio (NR) system; or may be an evolved NodeB (eNB or eNodeB) in LTE, a relay station or an access point, an in-vehicle device, a wearable device, a network device in a future 5G network, a network device in a future evolved PLMN, or the like.

The foregoing listed functions and specific implementations of the terminal device and the network device are merely described by way of example, and this is not limited in this application.

Figure 9:
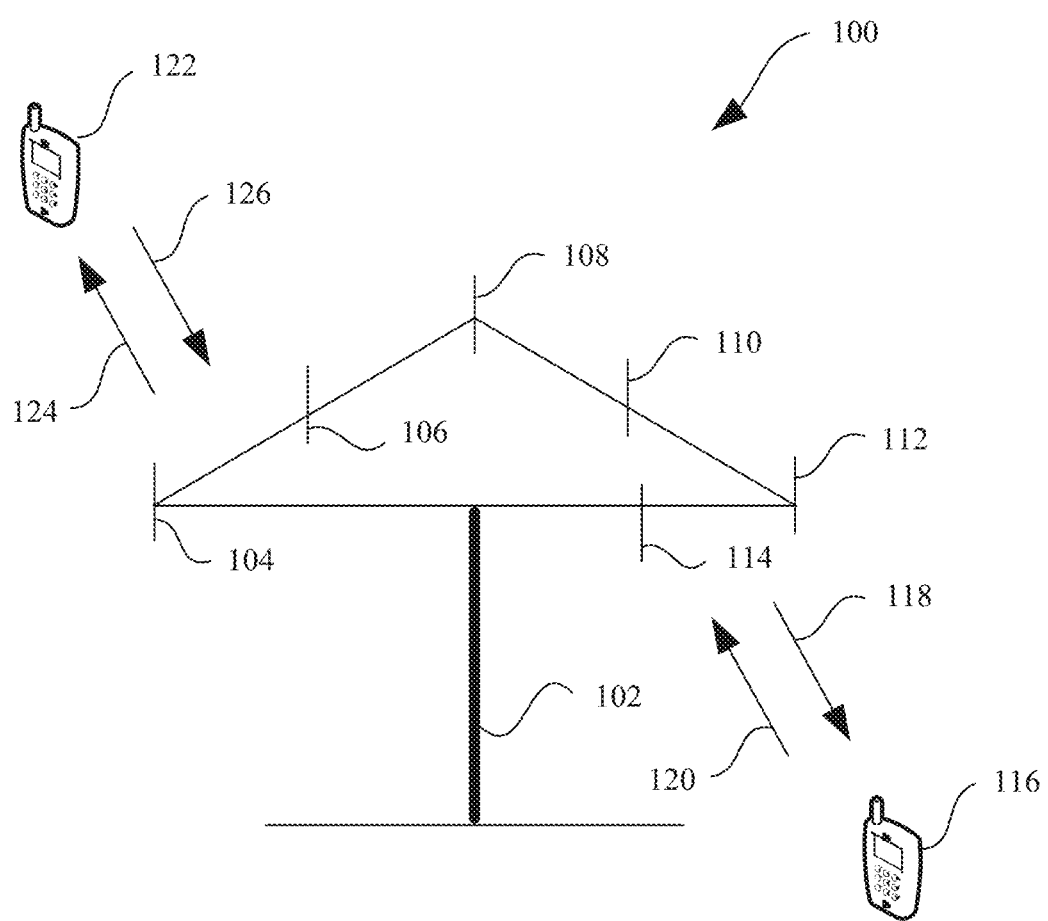
FIG. 9 is a schematic diagram of a communications system according to an embodiment of this application.

FIG. 9 is a schematic diagram of a system 100 that can be applied to a method and apparatus for obtaining a resource indication value according to an embodiment of this application. As shown in FIG. 9, the system 100 includes a network device 102. The network device 102 may include one or more antennas, for example, antennas 104, 106, 108, 110, 112, and 114. In addition, the network device 102 may additionally include a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. The network device 102 may communicate with a plurality of terminal devices (for example, a terminal device 116 and a terminal device 122). However, it can be understood that the network device 102 may communicate with any quantity of terminal devices similar to the terminal device 116 or 122.

As shown in FIG. 9, the terminal device 116 communicates with the antennas 112 and 114. The antennas 112 and 114 send information to the terminal device 116 by using a forward link (also referred to as a downlink) 118, and receive information from the terminal device 116 by using a reverse link (also referred to as an uplink) 120. In addition, the terminal device 122 communicates with the antennas 104 and 106. The antennas 104 and 106 send information to the terminal device 122 by using a forward link 124, and receive information from the terminal device 122 by using a reverse link 126.

It should be noted that FIG. 9 is only a simplified schematic diagram of an example. The network may further include another network device that is not shown in FIG. 9.

The following describes in detail the method for obtaining a resource indication value provided in the embodiments of this application with reference to the accompanying drawings.

Embodiment 1

Figure 10:
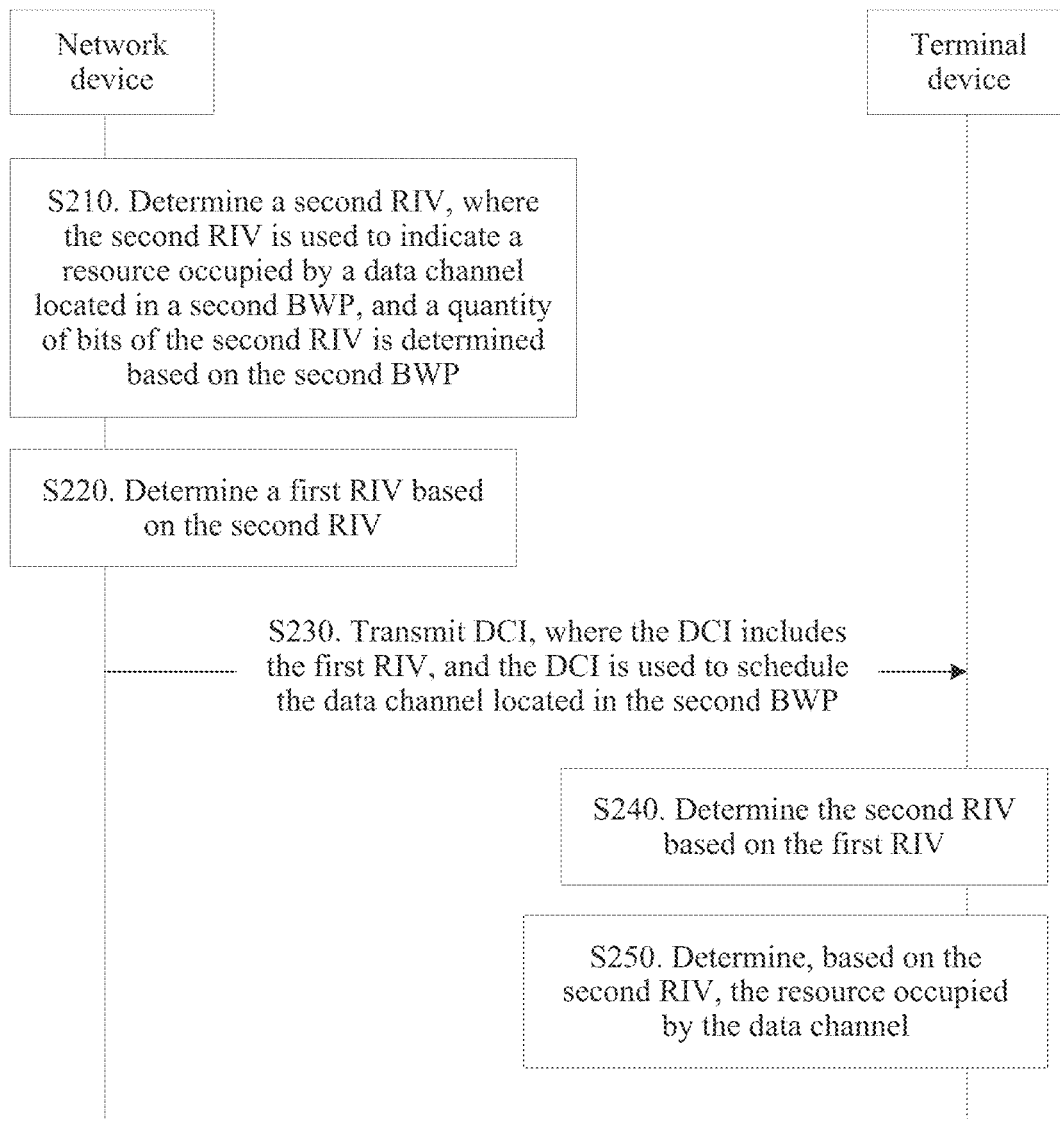
FIG. 10 is a schematic flowchart of a method for obtaining a resource indication value according to an embodiment of this application.

FIG. 10 shows a method for obtaining a resource indication value 200.

In S210, a network device determines a second resource indication value (RIV) r, where the second RIV r is used to indicate a resource occupied by a data channel located in a second bandwidth part (BWP), and a quantity of bits required for the second RIV r is determined based on the second BWP.

Herein, the network device may determine the second resource indication value (RIV) r based on a bandwidth $N_{RB}^{BWP2}$ of the second BWP. For this reason, it may be understood that the second RIV r is obtained by using a dendrogram with a depth of $N_{RB}^{BWP2}$ and a bottom-most layer having $N_{RB}^{BWP2}$ nodes. Certainly, in an implementation process of this embodiment, the dendrogram may not be specifically used, and this description is merely for ease of understanding.

The data channel may be a PDSCH/PUSCH. The resource occupied by the data channel may be a PRB frequency domain resource occupied by the data channel. In this case, the network device may determine a number of a PRB allocated to a terminal device (for example, a number of the PRB in the second BWP), obtain a number of a VRB by using a mapping relationship (for example, an interleaving or non-interleaving mapping relationship) between a number of a PRB and a number of a VRB, and then determine the second RIV r based on the number of the VRB and the bandwidth of the second BWP. Correspondingly, the terminal device may obtain a starting VRB number and a quantity of contiguously numbered VRBs by using the second RIV r and the bandwidth of the second BWP, and then obtain, by using the mapping relationship between a number of a PRB and a number of a VRB, a number of a PRB allocated to the terminal device, so as to obtain a frequency domain position, of each PRB allocated to the terminal device, in the second BWP.

Usually, a frequency domain resource allocation manner of the second BWP is a type 1. For example, a quantity of bits of a first RIV n is determined based on a subcarrier spacing and a bandwidth of a first BWP.

In S220, the network device determines a first RIV n based on the second RIV r, where $r=\lfloor \pm a \cdot n + b \rfloor$ or $r=\lfloor a \cdot n \rfloor$. In addition, $r=\lceil \pm a \cdot n + b \rceil$ or $r=\lceil a \cdot n \rceil$ may also be applied to this embodiment.

In S230, the network device sends downlink control information (DCI), where the DCI includes the first RIV n, and the DCI is used to schedule the data channel located in the second BWP.

In S230, the terminal device receives the DCI, where the quantity of bits of the first RIV n is determined based on the first bandwidth part (BWP).

For example, the quantity of bits of the first RIV n is determined based on the subcarrier spacing and the bandwidth of the first BWP. For another example, when a frequency domain resource allocation type of the first BWP is a type 0, the quantity of bits of the first RIV n is determined based on the subcarrier spacing and the bandwidth of the first BWP, and a data resource scheduling granularity, and the resource scheduling granularity may be a resource block group (RBG) size, a granularity of an allocated VRB, or the like. A RBG means a group of contiguous resource blocks (RB) in frequency domain.

In S240, a terminal device determines the second RIV r based on the first RIV n, where $r=\lfloor \pm a \cdot n + b \rfloor$ or $r=\lfloor a \cdot n \rfloor$.

In S250, the terminal device determines, based on the second RIV r, the resource occupied by the data channel.

Herein, the terminal device may determine, based on the second RIV r and the bandwidth $N_{RB}^{BWP2}$ of the second BWP, the resource occupied by the data channel. For this reason, it may be understood that the second RIV r is obtained through interpretation by using a dendrogram with a depth of $N_{RB}^{BWP2}$ and a bottom-most layer having $N_{RB}^{BWP2}$ nodes. Certainly, in an implementation process of this embodiment, the dendrogram may not be specifically used, and this description is merely for ease of understanding.

Herein, a is a positive number, and b is a positive integer.

In the foregoing manner, both a quantity of VRBs corresponding to the second RIV and types of the quantity of these VRBs increase, so that flexibility of scheduling a data channel by the network device increases.

The following describes calculation manners of a and b by using examples.

Optionally, a is determined based on the bandwidth $N_{RB}^{BWP1}$ of the first BWP and the bandwidth $N_{RB}^{BWP2}$ of the second BWP. Herein, the bandwidth $N_{RB}^{BWP1}$ of the first BWP and the bandwidth $N_{RB}^{BWP2}$ of the second BWP each are a quantity of PRBs corresponding to the bandwidth of the BWP, and the quantity may be determined based on the bandwidth (for example, 20 MHz) and the subcarrier spacing (for example, 15 KHz) of the BWP.

For example, $a=2^k$, $k=k2-k1$, k2 is a quantity of bits required to indicate a frequency domain resource in the second BWP, and k1 is the quantity of bits of the first RIV n. Herein, k1 may be determined based on the bandwidth $N_{RB}^{BWP1}$ of the first BWP, $k1=\lceil \log_2 N_{RB}^{BWP1}(N_{RB}^{BWP1}+1)/2 \rceil$, k2 may be determined based on the bandwidth $N_{RB}^{BWP2}$ of the second BWP, and $k2=\lceil \log_2 N_{RB}^{BWP2}(N_{RB}^{BWP2}+1)/2 \rceil$.

The quantity of bits required for the frequency domain resource in the second BWP is a quantity of bits that can meet all possible values of frequency domain resource information (for example, the second RIV) indicating the data channel transmitted in the second BWP. For example, for the frequency domain resource allocation type 1, the frequency domain resource information of the data channel transmitted in the second BWP ranges from 0 to $N_{RB}^{BWP2}(N_{RB}^{BWP2}+1)/2-1$. Therefore, the quantity of bits required for the frequency domain resource in the second BWP is $\lceil \log_2 N_{RB}^{BWP2}(N_{RB}^{BWP2}+1)/2 \rceil$.

Usually, in this manner, the frequency domain resource allocation type of the first BWP is the type 1, and therefore a quantity of bits k1 is $k1=\lceil \log_2 N_{RB}^{BWP1}(N_{RB}^{BWP1}+1)/2 \rceil$.

In this manner, values of the RIV are distributed at intervals of $2^k$.

For another example, k1 is determined based on the bandwidth $N_{RB}^{BWP1}$ of the first BWP and a quantity P1 of virtual resource blocks (VRB) included in a resource block group (RBG) in the first BWP, $k1=\lceil N_{RB}^{BWP1}/P1 \rceil$, k2 is determined based on the bandwidth $N_{RB}^{BWP2}$ of the second BWP, and $k2=\lceil \log_2 N_{RB}^{BWP2}(N_{RB}^{BWP2}+1)/2 \rceil$.

Usually, in this manner, the frequency domain allocation type of the first BWP is the type 0.

For another example, $a=2^k$, $k=\lfloor \log_2(N/M) \rfloor$, M is a total quantity of statuses that can be represented by the quantity of bits of the first RIV n, and N is a total quantity of statuses required to indicate a frequency domain resource in the second BWP.

The total quantity of statuses that can be represented by the quantity of bits of the first RIV n is a quantity of decimal numbers that can be represented by the quantity of bits. For example, when the quantity of bits of the first RIV n is k1, k1 bits can represent $2^{k1}$ decimal numbers, and therefore, the total quantity of statuses that can be represented by the quantity of bits of the first RIV n is $2^{k1}$.

The total quantity of statuses required for the frequency domain resource in the second BWP is a quantity of all possible values of frequency domain information (for example, the second RIV) indicating the data channel transmitted in the second BWP. For example, for the frequency domain resource allocation type 1, the frequency domain resource information of the data channel transmitted in the second BWP ranges from 0 to $N_{RB}^{BWP2}(N_{RB}^{BWP2}+1)/2-1$. Therefore, the total quantity of statuses required for the frequency domain resource in the second BWP is $N_{RB}^{BWP2}(N_{RB}^{BWP2}+1)/2-1$.

Usually, in this manner, the frequency domain resource allocation manner of the first BWP is the type 1.

In this manner, it can be ensured that all obtained values of the second RIV can be used to indicate a frequency domain resource of a data channel.

For another example, $a=\lfloor N/M \rfloor$ or $a=N/M$, M is a total quantity of statuses that can be represented by the quantity of bits of the first RIV n, and N is a total quantity of statuses required to indicate a frequency domain resource in the second BWP.

Usually, in this manner, the frequency domain resource allocation manner of the first BWP is the type 1.

For example, $M=2^{k1}$, and k1 is the quantity of bits of the first RIV n.

In this manner, it can be ensured that all obtained values of the second RIV can be used to indicate a frequency domain resource of a data channel.

For another example, N is determined based on the bandwidth $N_{RB}^{BWP2}$ of the second BWP, and $N=N_{RB}^{BWP2}(N_{RB}^{BWP2}+1)/2$. Alternatively, N is determined based on the bandwidth $N_{RB}^{BWP2}$ of the second BWP and a scheduling granularity P2, and $N=\lfloor N_{RB}^{BWP2}/P2 \rfloor(\lfloor N_{RB}^{BWP2}/P2 \rfloor+1)/2$.

Herein, the scheduling granularity P2 (which may also be referred to as a scheduling unit, a resource unit, a scheduling step forward value, or the like) is a granularity of a VRB allocated to the terminal device by the network device, in other words, is mainly for the frequency domain RA type 1. When a data channel scheduled by the network device for the terminal device is transmitted in a BWP with a bandwidth of $N_{RB}^{BWP}$, a quantity of VRBs allocated by the network device to the terminal device may range from P2 to $\lfloor N_{RB}^{BWP}/P2 \rfloor \cdot P2$, and stepping forward is performed at intervals of P2. With reference to the foregoing method, a number $RB'_{start}$ and a length $L'_{RBs}$ may be determined based on the second RIV r and the bandwidth of the second BWP. In this case, a number of a starting VRB in contiguous VRBs allocated by the network device to the terminal device is $RB_{start} = P2 \cdot RB'_{start}$, and a quantity of these contiguous VRBs is $L_{RBs} = P2 \cdot L'_{RBs}$.

A network system may configure at least one value of a scheduling granularity P2 for the terminal device, for example, the value may be predefined or configured by using higher layer signaling.

Optionally, the network system may configure a value of the scheduling granularity P2 through predefinition, for example, the value may be 2 or 4. In addition, the present invention does not exclude another possible value, for example, 3 or 8.

Optionally, the network device may select one of a plurality of configured candidate scheduling granularity values as a value of the scheduling granularity P2.

The scheduling granularity P2 may be determined based on only the bandwidth $N_{RB}^{BWP2}$ of the second BWP. For example, a correspondence between the bandwidth $N_{RB}^{BWP2}$ of the second BWP and the value of the scheduling granularity P2 may be predefined by the system. For example, the scheduling granularity P2 may be determined by using one of Table 2 and Table 3 below.

TABLE 2

Correspondence 1 between a bandwidth of a BWP and a scheduling granularity

| Bandwidth of a BWP | P |
|---|---|
| 1-36 | 2 |
| 37-72 | 4 |
| 73-144 | 8 |
| 145-275 | 16 |

TABLE 3

Correspondence 2 between a bandwidth of a BWP and a scheduling granularity

| Bandwidth of a BWP | P |
|---|---|
| 1-36 | 4 |
| 37-72 | 8 |
| 73-144 | 16 |
| 145-275 | 16 |

The scheduling granularity P2 may be alternatively determined based on the bandwidth $N_{RB}^{BWP1}$ of the first BWP and the bandwidth $N_{RB}^{BWP2}$ of the second BWP. For example, $P2 = \lfloor N_{RB}^{BWP2}/N_{RB}^{BWP1} \rfloor$.

For another example, the value of the scheduling granularity P2 may be determined based on the quantity of bits of the first RIV n, so that the quantity of bits required to indicate the frequency domain resource in the second BWP is as equal as possible to (or is equal to) the quantity of bits of the first RIV n. For example, to make full use of all possible values of the quantity k1 of bits of the first RIV n, a value of P2 may be: $P2 = \lfloor N_{RB}^{BWP2}/c \rfloor$ or $P2 = \lceil N_{RB}^{BWP2}/c \rceil$, where a value of c is $\lfloor (\sqrt{2^{k1+3+1}}-1)/2 \rfloor$, and k1 is the quantity of bits of the first RIV n. In other words, optionally, the value of the scheduling granularity P2 is determined by the quantity of bits of the first R1V n and the bandwidth $N_{RB}^{BWP2}$ of the second BWP.

In consideration of compatibility between the frequency domain RA type 1 and the frequency domain RA type 0, a possible value that meets $P2 \leq \lfloor N_{RB}^{BWP2}/N_{RB}^{BWP1} \rfloor$, $P2 \leq \lfloor N_{RB}^{BWP2}/c \rfloor$, or $P2 \leq \lceil N_{RB}^{BWP2}/c \rceil$ may be selected as the scheduling granularity P2 from possible values (currently known possible values are 2, 4, 8, and 16) of an RBG size that are applicable to the frequency domain RA type 0. For example, a greatest possible value or a smallest possible value may be selected as the scheduling granularity P2 from these possible values that meet the foregoing formulas. In this manner, resource use efficiency can be improved. For example, $P2 \leq \lfloor N_{RB}^{BWP2}/N_{RB}^{BWP1} \rfloor$, the bandwidth $N_{RB}^{BWP1}$ of the first BWP is 5 M (with a subcarrier of 15 KHz and 25 RBs), and the bandwidth $N_{RB}^{BWP2}$ of the second BWP is 40 M (with a subcarrier of 15 KHz and 216 RBs). $P2 \leq \lfloor N_{RB}^{BWP2}/N_{RB}^{BWP1} \rfloor = \lfloor 216/25 \rfloor = 8$, and it can be learned that a maximum RBG size that meets the formula is 8, and 8 may be selected as the scheduling granularity P2.

In addition, a may be determined based on a maximum quantity $N_{RB}^{BWP1}$ of VRBs that may be allocated to the terminal device in the first BWP and a maximum quantity $N_{RB}^{BWP2}$ of VRBs that may be allocated to the terminal device in the second BWP. In this case, the parameters $N_{RB}^{BWP1}$ and $N_{RB}^{BWP2}$ included in the foregoing formula may be respectively replaced with $N_{RB}^{BWP1}$ and $N_{RB}^{BWP2}$.

When $r = \lfloor a \cdot n + b \rfloor$ or $r = \lceil a \cdot n + b \rceil$, optionally, b meets one of the following: b is configured by using higher layer signaling; or b is determined based on a parameter configured for the terminal device. For example, $b = n_{UE} \mod(\lfloor a \rfloor)$, and $n_{UE}$ is the parameter configured for the terminal device. For example, a value of $n_{UE}$ may be a C-RNTI value $n_{RNTI}$ configured for the terminal device, or may be an ID number of a CORESET in which the DCI is located. In addition, b may be alternatively configured by using physical layer signaling. For example, an information field is added to the DCI to indicate b.

In this manner, different b may be configured for different terminal devices (or terminal devices of different groups), or different b may be calculated based on parameters that can be distinguished from each other between different terminal devices (or terminal devices of different groups), so that value ranges of the second RIV of different terminal devices are different. Therefore, numbers and quantities of VRBs scheduled for different terminal devices are different. When the network device schedules data channels for a plurality of terminal devices in a same BWP, efficiency of using PRB resources can be improved. In addition, value distribution of the second RIV can be adjusted based on a value of b. When the value of b is relatively large, it can be ensured that a value of the second RIV is relatively large, so that a quantity of VRBs corresponding to the second RIV is relatively large.

When $r = \lfloor \pm a \cdot n + b \rfloor$, optionally, $b = -b1 + b2$, and b1 meets one of the following: b1 is configured by using higher layer signaling; or b1 is determined based on a parameter configured for the terminal device; and $b2 = N-1$, and N is the total quantity of statuses required to indicate the frequency domain resource in the second BWP. For example, $b1 = n_{UE}^{ID} \mod(\lfloor a \rfloor)$, and $n_{UE}^{ID}$ is the parameter configured for the terminal device. For example, a value of $n_{UE}$ may be a C-RNTI value $n_{RNTI}$ configured for the terminal device. In addition, b may be alternatively configured by using physical layer signaling. For example, an information field is added to the DCI to indicate b.

In this manner, different b may be configured for different terminal devices (or terminal devices of different groups), or different b may be calculated based on parameters that can be distinguished from each other between different terminal devices (or terminal devices of different groups), so that value ranges of the second RIV of different terminal devices are different. Therefore, numbers and quantities of VRBs scheduled for different terminal devices are different. When the network device schedules data channels for a plurality of terminal devices in a same BWP, efficiency of using PRB resources can be improved. In addition, value distribution of the second RIV can be adjusted based on a value of b1. When the value of b1 is relatively small, it can be ensured that a value of the second RIV is relatively large, so that a quantity of VRBs corresponding to the second RIV is relatively large.

The following still uses the case shown in FIG. 7 as an example for describing the foregoing solution.

Example 1

For example, $r=\lfloor a \cdot n \rfloor$, $a=2^k$, $k=k2-k1$, $k1=\lceil \log_2 N_{RB}^{BWP1}(N_{RB}^{BWP1}+1)/2 \rceil$, and $k2=\lceil \log_2 N_{RB}^{BWP2}(N_{RB}^{BWP2}+1)/2 \rceil$.

When $r=\lfloor a \cdot n \rfloor$, it may be understood that k 0s are padded after a least significant bit of a binary value of the first RIV to obtain a binary value of the second RIV. In this case, a decimal value of the second RIV is $2^k$ times a decimal value of the first RIV. In the case shown in FIG. 7, the bandwidth $N_{RB}^{BWP1}$ of the first BWP is 4, and the bandwidth $N_{RB}^{BWP2}$ of the second BWP is 10. Therefore, k1 is 4, k2 is 6, and k is 6−4=2. For example, when the binary value of the first RIV is "1011" (whose decimal value is 11), the decimal value of the second RIV is 11×4=44 (whose binary value is "101100"), and "101100" may be obtained by padding k=2 0s after a least significant bit of "1011".

Figure 11:
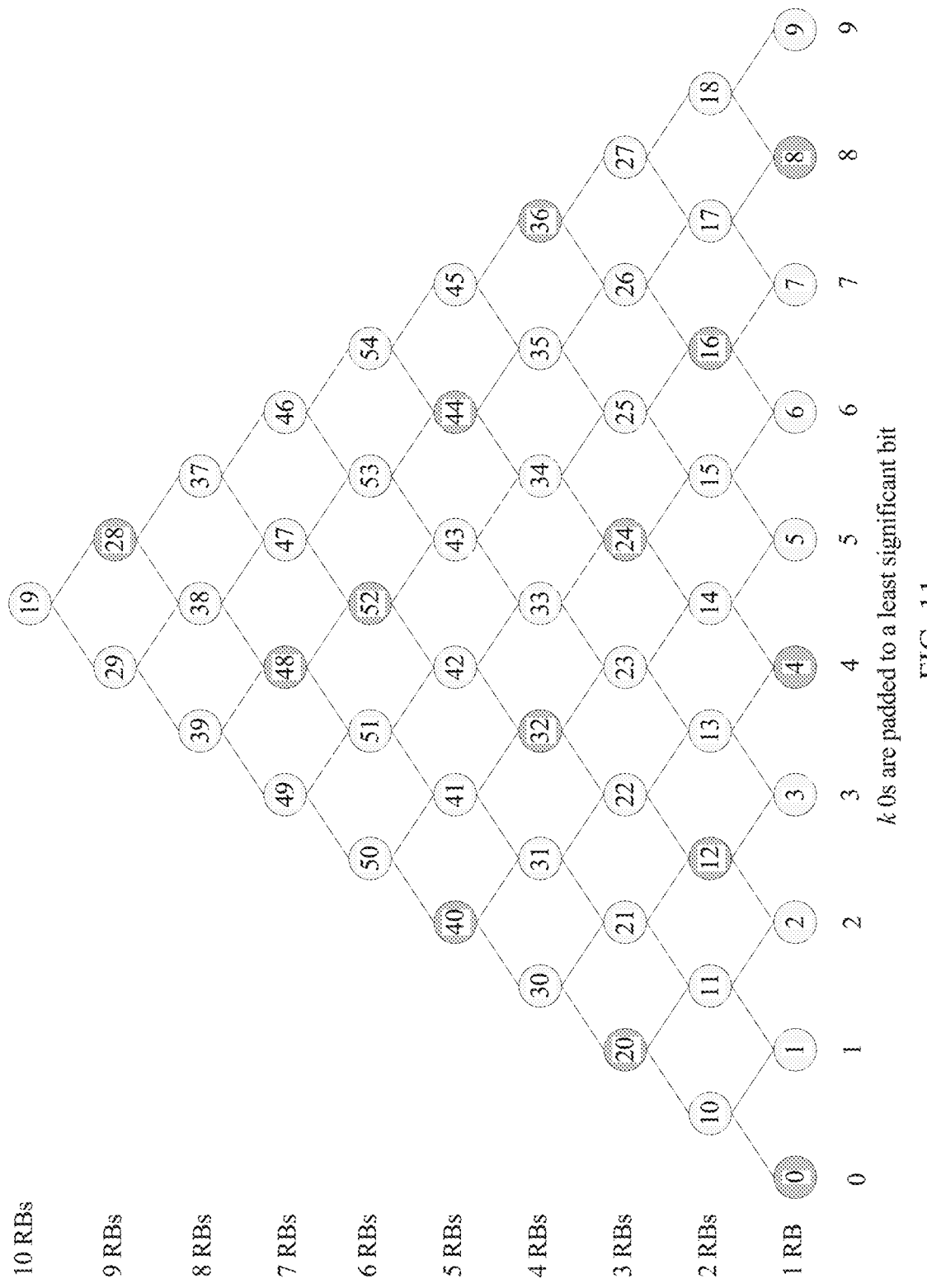
FIG. 11 is a schematic diagram of a dendrogram representing a correspondence between a resource indication value and a virtual resource block according to a method for obtaining a resource indication value in an embodiment of this application.

To be specific, within a value range of a status that can be represented by the quantity of bits required to indicate the frequency domain resource in the second BWP, a value is obtained at intervals of $2^k$ in ascending order of values, so that a possible value of the second RIV can be obtained. In the case shown in FIG. 7, the quantity k1 of bits of the first RIV is 4. Therefore, a value range of the first RIV is {0, 1, 2, . . . , 15}. The quantity k2 of bits required to indicate the frequency domain resource in the second BWP is 6, and the value range of the status that can be represented by the quantity is {0, 1, 2 . . . 63}. Therefore, a value range of the second RIV is {0, 4, 8, . . . , 60}. As shown in FIG. 11, a colored node in the dendrogram represents the value range of the second RIV. It may be learned that, in comparison with an existing manner, both a quantity of VRBs corresponding to the second RIV and types of the quantity of these VRBs increase, and values of the RIV are relatively evenly distributed, so that flexibility of scheduling a data channel by the network device increases.

Example 2

For example, $r=\lfloor a \cdot n \rfloor$, $a=2^k$, $k=\lfloor \log_2(N/M) \rfloor$, $M=2^{k1}$, $k1=\lceil \log_2 N_{RB}^{BWP1}(N_{RB}^{BWP1}+1)/2 \rceil$, and $N=N_{RB}^{BWP2}(N_{RB}^{BWP2}+1)/2$.

When $r=\lfloor a \cdot n \rfloor$, it may be understood that k 0s are padded after a least significant bit of a binary value of the first RIV, and (k'−k) 0s are padded before a most significant bit of the binary value of the first RIV, to obtain a binary value of the second RIV. A value of k' is the same as a value of k in Example 1 (and is 2 in the case shown in FIG. 7). In this case, a decimal value of the second RIV is $2^k$ times a decimal value of the first RIV. In the case shown in FIG. 7, the bandwidth $N_{RB}^{BWP1}$ of the first BWP is 4, the bandwidth $N_{RB}^{BWP2}$ of the second BWP is 10, the quantity k1 of bits of the first RIV is 4, the total quantity M of statuses that can be represented by the quantity is 16, and the total quantity N of statuses required to indicate the frequency domain resource in the second BWP is 55. Therefore, k is 1, and a is 2. For example, when the binary value of the first RIV is "1011" (whose decimal value is 11), the decimal value of the second RIV is 11×2=22 (whose binary value is "010110"), and "010110" of the second RIV may be obtained by padding k=1 0 after a least significant bit of "1011" of the first RIV and by padding k2=2−1=1 0 before a most significant bit of "1011".

Figure 12:
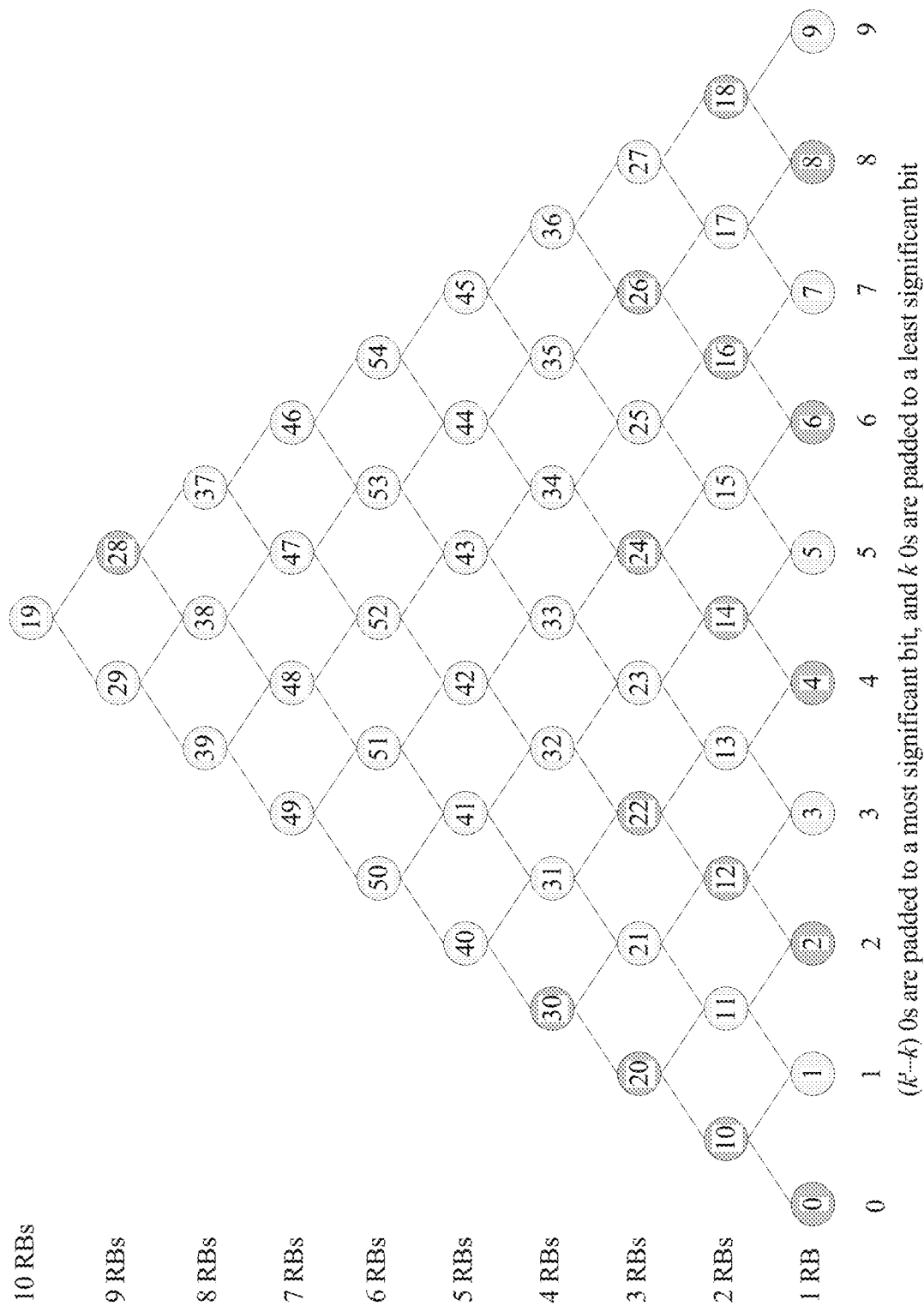
FIG. 12 is another schematic diagram of a dendrogram representing a correspondence between a resource indication value and a virtual resource block according to a method for obtaining a resource indication value in an embodiment of this application.

To be specific, within a value range of a status that can be represented by the quantity of bits required to indicate the frequency domain resource in the second BWP, a value is obtained at intervals of $2^k$ in ascending order of values, so that a possible value of the second RIV can be obtained. In the case shown in FIG. 7, the quantity k1 of bits of the first RIV is 4. Therefore, a value range of the first RIV is {0, 1, 2, . . . , 15}. The total quantity N of statuses required to indicate the frequency domain resource in the second BWP is 55, and a value range of the second RIV is {0, 1, 2, . . . , 54}. Therefore, a value range of the second RIV is {0, 2, 4, . . . , 30}. As shown in FIG. 12, a colored node in the dendrogram represents the value range of the second RIV. It may be learned that, in comparison with an existing manner, both a quantity of VRBs corresponding to the second RIV and types of the quantity of these VRBs increase, so that flexibility of scheduling a data channel by the network device increases. In addition, this manner can ensure that all values of the second RIV can be used.

Example 3

For example, $r=\lfloor -a \cdot n + b \rfloor$, $a=2^k$, $k=\lfloor \log_2(N/M) \rfloor$, $M=2^{k1}$, $k1=\lceil \log_2 N_{RB}^{BWP1}(N_{RB}^{BWP1}+1)/2 \rceil$, $N=N_{RB}^{BWP2}(N_{RB}^{BWP2}+1)/2$, $b=-b1+b2$, and $b2=N-1$.

When b1=0, it may be understood that k 0s are padded after a least significant bit of a binary value of the first RIV, (k'−k) 0s are padded before a most significant bit of the binary value of the first RIV, and then subtraction is performed between b2=N−1 and a value obtained after the zero-padding, to obtain a binary value of the second RIV. A value of k' is the same as a value of k in Example 1 (and is 2 in the case shown in FIG. 7). In the case shown in FIG. 7, the bandwidth $N_{RB}^{BWP1}$ of the first BWP is 4, the bandwidth $N_{RB}^{BWP2}$ of the second BWP is 10, the quantity k1 of bits of the first RIV is 4, the total quantity M of statuses that can be represented by the quantity is $2^4=16$, and the total quantity N of statuses required to indicate the frequency domain resource in the second BWP is 55. Therefore, k is 1, a is 2, and b2 is 54. For example, when the binary value of the first RIV is "1011" (whose decimal value is 11), a decimal value of the second RIV is −(11×2)+54=32 (whose binary value is "100000"), "010110" may be obtained by padding k=1 0 after a least significant bit of "1011" of the first RIV and by padding k2=2−1=1 0 before a most significant bit of "1011", and then "100000" of the second RIV is obtained by subtracting "010110" from "110110" (whose decimal value is 54).

Figure 13:
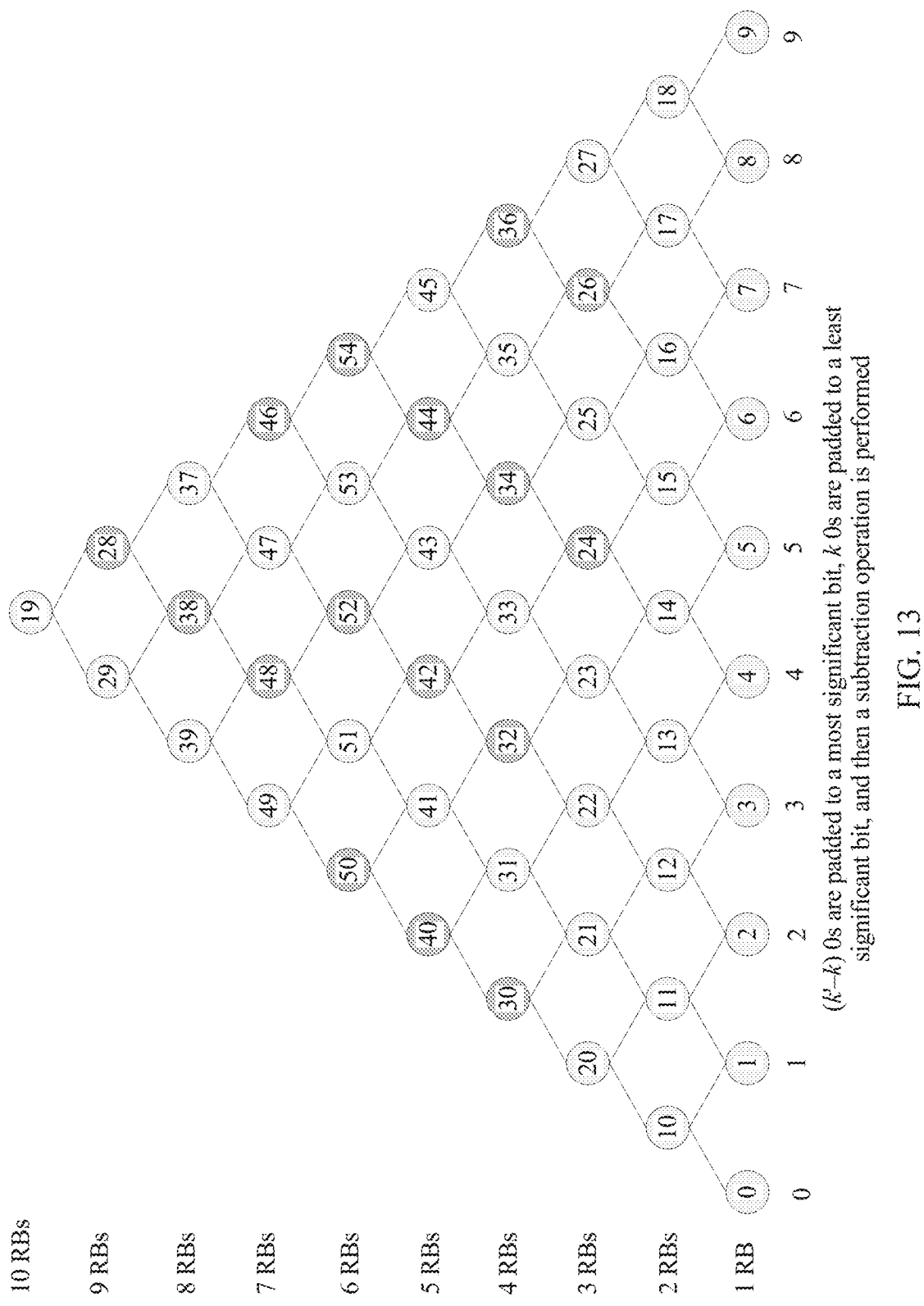
FIG. 13 is another schematic diagram of a dendrogram representing a correspondence between a resource indication value and a virtual resource block according to a method for obtaining a resource indication value in an embodiment of this application.

To be specific, within a value range of a status that can be represented by the quantity of bits required to indicate the frequency domain resource in the second BWP, a value is obtained at intervals of $2^k$ in descending order of values, so that a possible value of the second RIV can be obtained. In the case shown in FIG. 7, the quantity k1 of bits of the first RIV is 4. Therefore, a value range of the first RIV is {0, 1, 2, . . . , 15}. The total quantity N of statuses required to indicate the frequency domain resource in the second BWP is 55, and a value range of the second RIV is {0, 1, 2, . . . 54}. Therefore, a value range of the second RIV is {54, 52, 50, . . . , 24}. As shown in FIG. 13, a colored node in the dendrogram represents the value range of the second RIV It may be learned that, in comparison with an existing manner, both a quantity of VRBs corresponding to the second RIV and types of the quantity of these VRBs increase, and particularly, the quantity of VRBs corresponding to the second RIV is relatively large, so that flexibility of scheduling a data channel by the network device increases. In addition, this manner can ensure that all values of the second RIV can be used.

Example 4

For example, $r=\lfloor a \cdot n \rfloor$, $a=\lfloor N/M \rfloor$, $M=2^{k1}$, $k1=\lceil \log_2 N_{RB}^{BWP1}(N_{RB}^{BWP1}+1)/2 \rceil$, and $N=N_{RB}^{BWP2}(N_{RB}^{BWP2}+1)/2$.

In the case shown in FIG. 7, the bandwidth $N_{RB}^{BWP1}$ of the first BWP is 4, the bandwidth $N_{RB}^{BWP2}$ of the second BWP is 10, the quantity k1 of bits of the first RIV is 4, the total quantity M of statuses that can be represented by the quantity is 16, and the total quantity N of statuses required to indicate the frequency domain resource in the second BWP is 55. Therefore, a is 3. For example, when a binary value of the first RIV is "1011" (whose decimal value is 11), a decimal value of the second RIV is 11×3=33 (whose binary value is "100001").

Figure 14:
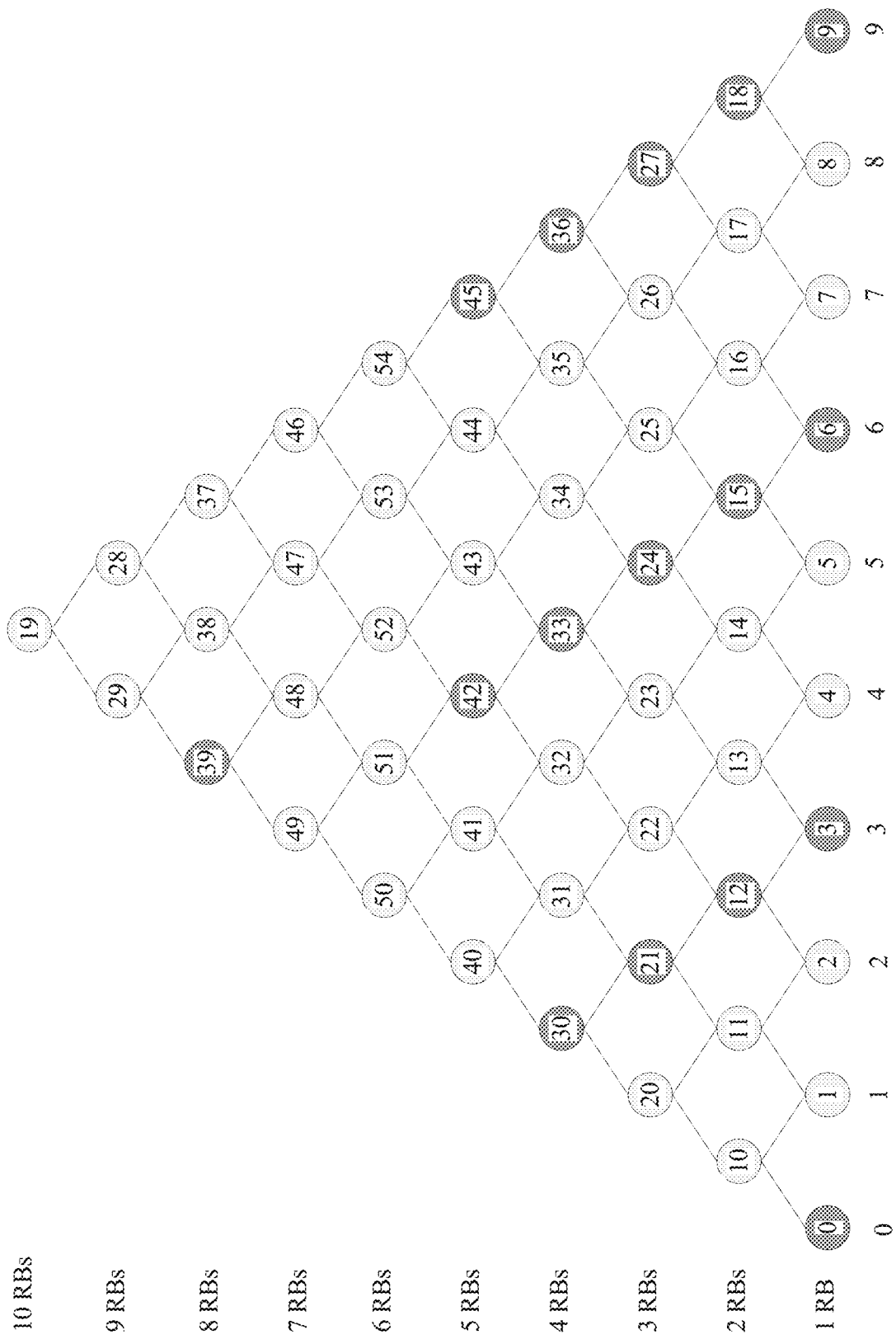
FIG. 14 is another schematic diagram of a dendrogram representing a correspondence between a resource indication value and a virtual resource block according to a method for obtaining a resource indication value in an embodiment of this application.

To be specific, within a value range of a status that can be represented by the quantity of bits required to indicate the frequency domain resource in the second BWP, a value is obtained at intervals of a in ascending order of values, so that a possible value of the second RIV can be obtained. In the case shown in FIG. 7, the quantity k1 of bits of the first RIV is 4. Therefore, a value range of the first RIV is {0, 1, 2, . . . , 15}. The total quantity N of statuses required to indicate the frequency domain resource in the second BWP is 55, and a value range of the second RIV is {0, 1, 2, . . . , 54}. Therefore, a value range of the second RIV is {0, 3, 6, . . . , 45}. As shown in FIG. 14, a colored node in the dendrogram represents the value range of the second RIV.

Figure 15:
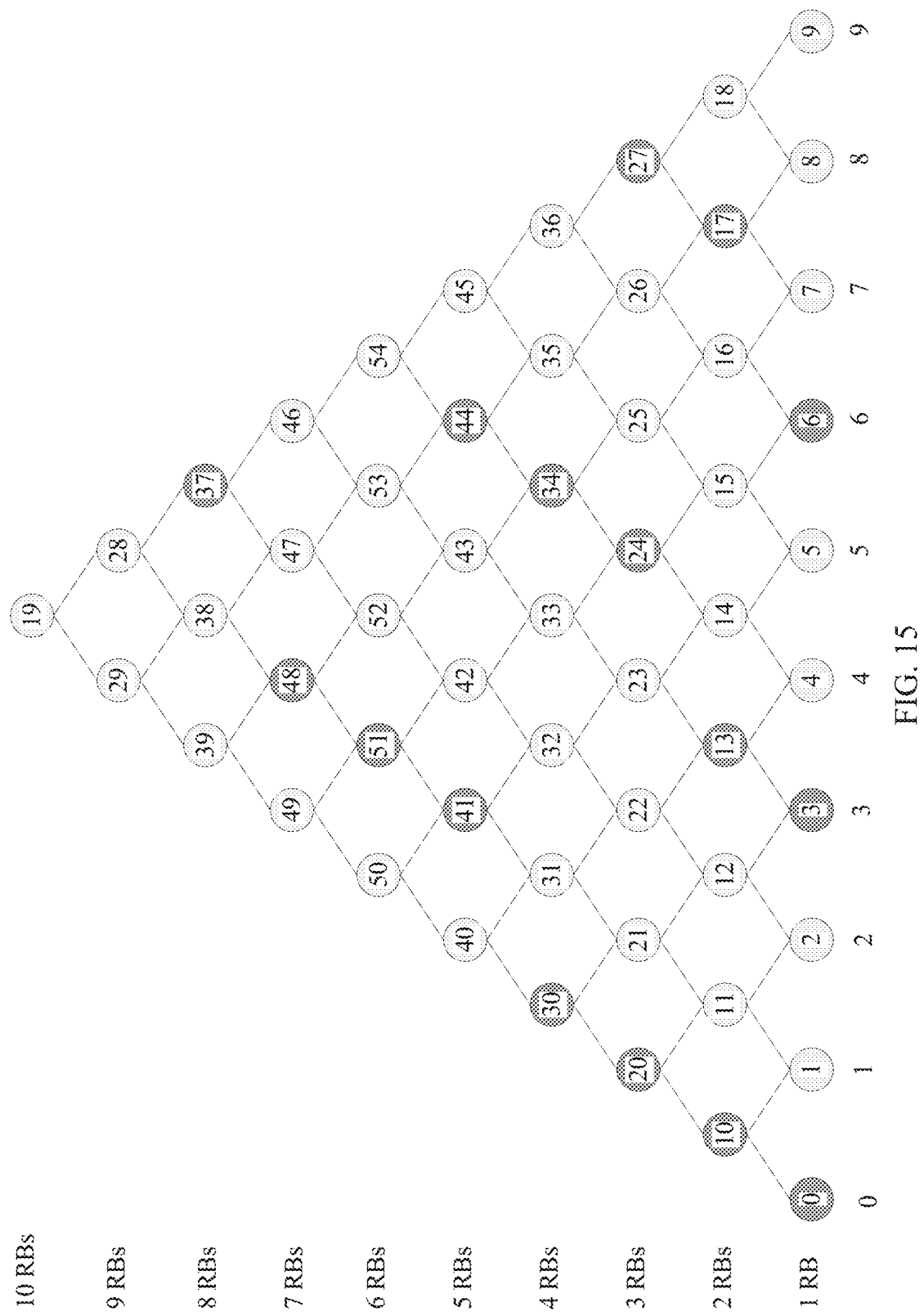
FIG. 15 is another schematic diagram of a dendrogram representing a correspondence between a resource indication value and a virtual resource block according to a method for obtaining a resource indication value in an embodiment of this application.

In addition, when a=N/M, similar to the foregoing calculation manner, a decimal value of the second RIV is 37 (whose binary value is "100101"). In this case, within a value range of a status that can be represented by the quantity of bits required to indicate the frequency domain resource in the second BWP, a value is obtained at intervals of a or a+1 in ascending order of values, so that a possible value of the second RIV can be obtained. As shown in FIG. 15, a colored node in the dendrogram represents a value range of the second RIV.

It may be learned from FIG. 14 and FIG. 15 that, in comparison with an existing manner, both a quantity of VRBs corresponding to the second RIV and types of the quantity of these VRBs increase, so that flexibility of scheduling a data channel by the network device increases. In addition, this manner can ensure that all values of the second RIV can be used.

Embodiment 2

Figure 16:
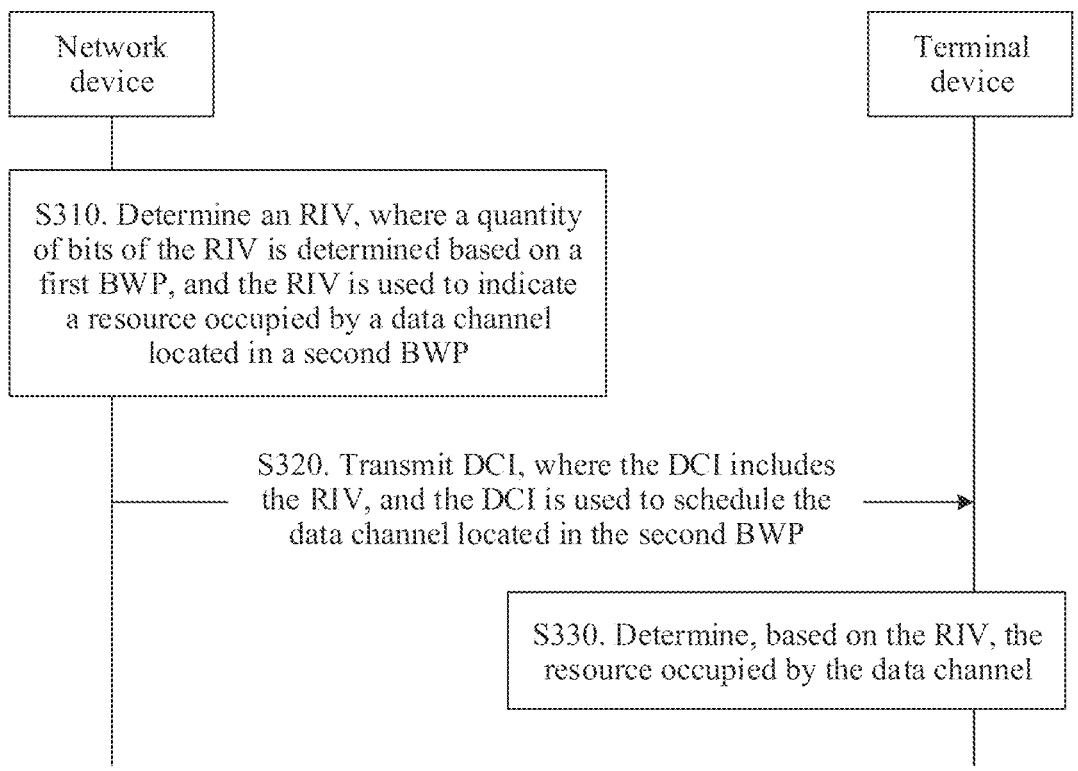
FIG. 16 is another schematic flowchart of a method for obtaining a resource indication value according to an embodiment of this application.

FIG. 16 shows a method 300 for obtaining a resource indication value.

In S310, a network device determines a resource indication value (RIV), where a quantity of bits of the RIV is determined based on a first bandwidth part (BWP), and the RIV is used to indicate a resource occupied by a data channel located in a second bandwidth part (BWP).

In S320, the network device sends downlink control information (DCI), where the DCI includes the RIV, and the DCI is used to schedule the data channel located in the second BWP.

In S320, a terminal device receives the DCI.

In S330, the terminal device determines, based on the RIV and a bandwidth of the first BWP, the resource occupied by the data channel.

Optionally, in S330, the terminal device determines a first number V1 and a first length L1 based on the RIV and the bandwidth of the first BWP, determines a second number V2 based on the first number V1 and an offset value, and determines, based on the second number V2 and the first length L1, the resource occupied by the data channel.

Herein, the terminal device determines a number $RB'_{start}$ (namely, the first number V1) and a length $L_{RBs}$ (namely, the first length L1) based on the RIV and the bandwidth of the first BWP. In this case, a number (namely, the second number V2) of a starting VRB in contiguous VRBs allocated by the network device to the terminal device is $RB_{start}=RB'_{start}+n_{offset}$, and a quantity of these contiguous VRBs is $L_{RBs}$.

For example, the offset value $n_{offset}$ is configured by using higher layer signaling, or the offset value $n_{offset}$ is a difference between a frequency domain starting position of the first BWP and a frequency domain starting position of the second BWP. An applicable scenario of this manner includes but is not limited to: a frequency domain range of the first BWP is within a frequency domain range of the second BWP.

Optionally, in S330, the terminal device determines a first number V1 and a first length L1 based on the RIV and the bandwidth $N_{RB}^{BWP1}$ of the first BWP; determines a second number V2 based on the first number V1, where $V2=\lfloor K \cdot V1 \rfloor$; determines a second length L2 based on the first length L1, where $L2=\lfloor K \cdot L1 \rfloor$, and K is a positive number; and determines, based on the second number V2 and the second length L2, the resource occupied by the data channel.

Herein, the terminal device determines a number $RB'_{start}$ (namely, the first number V1) and a length $L'_{RBs}$ (namely, the first length L1) based on the RIV and the bandwidth of the first BWP. In this case, a number (namely, the second number V2) of a starting VRB in contiguous VRBs allocated by the network device to the terminal device is $RB_{start}=\lfloor K \cdot RB'_{start} \rfloor$, and a quantity (namely, the second length L2) of these contiguous VRBs is $L_{RBs}=\lfloor K \cdot L'_{RBs} \rfloor$.

For example, K is determined based on the bandwidth $N_{RB}^{BWP1}$ of the first BWP and a bandwidth $N_{RB}^{BWP2}$ of the second BWP, and $K=N_{RB}^{BWP2}/N_{RB}^{BWP1}$. Alternatively, K may be obtained according to a method for determining a scheduling granularity P2, a definition of the scheduling granularity P2 is already described in the foregoing embodiment, and all methods for determining the scheduling granularity P2 may be used for determining K. Details are not described herein again.

For example, $K=N_{RB}^{BWP2}/N_{RB}^{BWP1}$, the bandwidth $N_{RB}^{BWP1}$ of the first BWP is 5 M (with a subcarrier of 15 KHz and 25 RBs), and the bandwidth $N_{RB}^{BWP2}$ of the second BWP is 40 M (with a subcarrier of 15 KHz and 216 RBs). When a binary value of the RIV is "011100110" (whose decimal value is 230), the number $RB'_{start}=5$ and the length $L'_{RBs}=10$ are determined based on the RIV and the bandwidth of the first BWP. In this case, a number of a starting VRB in contiguous VRBs allocated by the network device to the terminal device is $RB_{start}=\lfloor K \cdot RB'_{start}\rfloor=\lfloor(216/25)\cdot 5\rfloor=43$, and a quantity of these contiguous VRBs is $L_{RBs}=\lfloor K \cdot L'_{RBs}\rfloor=\lfloor(216/25)\cdot 10\rfloor=86$.

Embodiment 3

Figure 17:
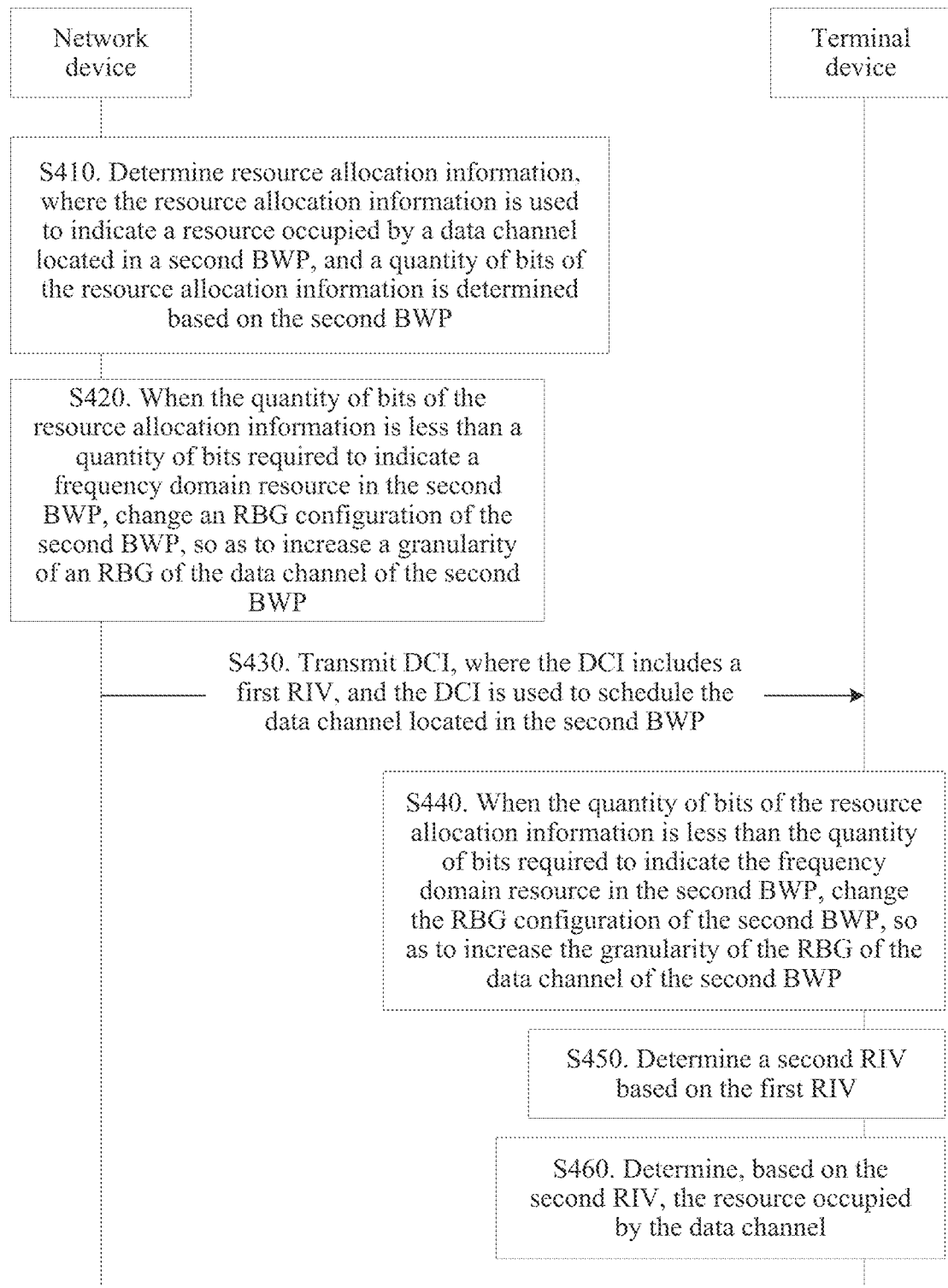
FIG. 17 is another schematic flowchart of a method for obtaining a resource indication value according to an embodiment of this application.

FIG. 17 shows a method for obtaining a resource indication value 400.

In S410, a network device determines frequency domain resource allocation information, where the frequency domain resource allocation information is used to indicate a resource occupied by a data channel located in a second bandwidth part (BWP), and a quantity of bits required for the frequency domain resource allocation information is determined based on the second BWP.

In S420, when the quantity k1 of bits of the frequency domain resource allocation information is less than a quantity k2 of bits required to indicate a frequency domain resource in the second BWP, the network device changes a resource block group (RBG) configuration of the second BWP, so as to increase a granularity of an RBG of the data channel of the second BWP.

Optionally, increasing the granularity of the RBG of the second BWP includes: changing the resource block group (RBG) configuration of the second BWP to a second RBG configuration when the RBG configuration of the second BWP is a first RBG configuration. In this case, the quantity of bits required to indicate the frequency domain resource in the second BWP is determined by the second RBG configuration and a bandwidth of the second BWP.

In S430, the network device sends downlink control information (DCI), where the DCI includes the frequency domain resource allocation information, and the DCI is used to schedule the data channel located in the second BWP.

In S440, a terminal device receives the DCI.

In S450, when the quantity k1 of bits of the frequency domain resource allocation information is less than the quantity k2 of bits required to indicate the frequency domain resource in the second BWP, increase the granularity of the RBG of the data channel, of the second BWP, received by the terminal device.

Optionally, in S450, that the RBG configuration of the second BWP received by the terminal device is changed includes: When the RBG configuration of the second BWP is the first RBG configuration, the resource block group (RBG) configuration of the second BWP is changed to the second RBG configuration. In this case, an RBG size represented by each of k1 bits of the frequency domain resource allocation information is determined by the second RBG configuration and the bandwidth of the second BWP.

In S460, the terminal device determines, based on the frequency domain resource allocation information, the resource occupied by the data channel.

Herein, a frequency domain resource allocation type of a first BWP is a type 1 or a type 0, and a frequency domain resource allocation type of the second BWP is the type 0.

Optionally, k1 is determined based on a bandwidth $N_{RB}^{BWP1}$ of the first BWP, $k1=\lceil \log_2 N_{RB}^{BWP1}(N_{RB}^{BWP1}+1)/2\rceil$, k2 is determined based on the bandwidth $N_{RB}^{BWP2}$ of the second BWP and a quantity P2 of VRBs included in the RBG of the second BWP, and $k2=\lceil N_{RB}^{BWP2}/P2\rceil$.

Optionally, k1 is determined based on a bandwidth $N_{RB}^{BWP1}$ of the first BWP and a quantity P1 of VRBs included in an RBG of the first BWP, $k1=\lceil N_{RB}^{BWP1}/P1\rceil$, k2 is determined based on the bandwidth $N_{RB}^{BWP2}$ of the second BWP, and $k2=\lceil N_{RB}^{BWP2}/P2\rceil$.

For a BWP whose frequency domain resource allocation type is the type 0, a frequency domain resource allocation information field in the BWP is a bitmap, and the bitmap indicates a position of an RBG allocated to a data channel. This is shown in Table 4 below.

TABLE 4

Correspondence between a size of a BWP and a size of an RBG

| Size of a BWP | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

It can be learned from Table 4 that two RBG configurations are predefined in a system. In the RBG configuration 1 (namely, the first RBG configuration), candidate values of RBG sizes are 2, 4, 8, and 16. In the RBG configuration 2 (namely, the second RBG configuration), candidate values of RBG sizes are 4, 8, and 16. The network device configures one RBG configuration for each BWP of each terminal device by using higher layer signaling, and the terminal device determines an RBG size by using a bandwidth of a BWP in which a data channel is located and an RBG configuration configured for the BWP. When the bandwidth of the BWP is $N_{BWP}^{RB}$, for an RBG with a size of P and a total quantity of RBGs in the BWP is $\lceil N_{BWP}^{RB}/P\rceil$, $\lceil N_{BWP}^{RB}/P\rceil$ bits are included in a corresponding bitmap in total, and each bit corresponds to one RBG.

With reference to the foregoing described method and FIG. 4, when the quantity of bits of the frequency domain resource allocation information is less than the quantity of bits required to indicate the frequency domain resource for transmitting the data channel in the second BWP, and when the RBG configuration of the second BWP is the configuration 1, the RBG configuration of the second BWP may be changed to the configuration 2, so that in some cases, the quantity of bits required to indicate the frequency domain resource for transmitting the data channel in the second BWP is reduced.

In addition, for the foregoing scenario 2, if a size of DCI in a format 0_0/1_0 transmitted in USS of a CORESET of an active BWP is determined by an initial BWP, a PDSCH scheduled by using the DCI in the format 10 is limited to being transmitted in an initial downlink BWP, and in addition, a PUSCH scheduled by using the DCI in the format 0-0 may be limited to being transmitted in an initial uplink BWP. In addition, for a problem that needs to be resolved in this application, an RIV generation formula may be alternatively changed as follows: When $RB_{start}\leq\lfloor N_{BWP}^{size}/2\rfloor$, $RIV=N_{BWP}^{size}-RB_{start}+(L_{RBs}-1)$; otherwise, $RIV=N_{BWP}^{size}(N_{BWP}^{size}-RB_{start})+(N_{BWP}^{size}-L_{RBs})$. Herein, $L_{RBs}\geq 1$, $L_{RBs}$ does not exceed $N_{BWP}^{size}-RB_{start}$, and $N_{BWP}^{size}$ is a bandwidth of a BWP, namely, a quantity of PRBs included in the BWP. Therefore, the RIV ranges from 0 to $\frac{1}{2}N_{BWP}^{size}(N_{BWP}^{size}+1)-1$, and a quantity of bits required for a frequency domain RA information field indicating the RIV is $\lceil \log_2 N_{BWP}^{size}(N_{BWP}^{size}+1)/2\rceil$.

Figure 18:
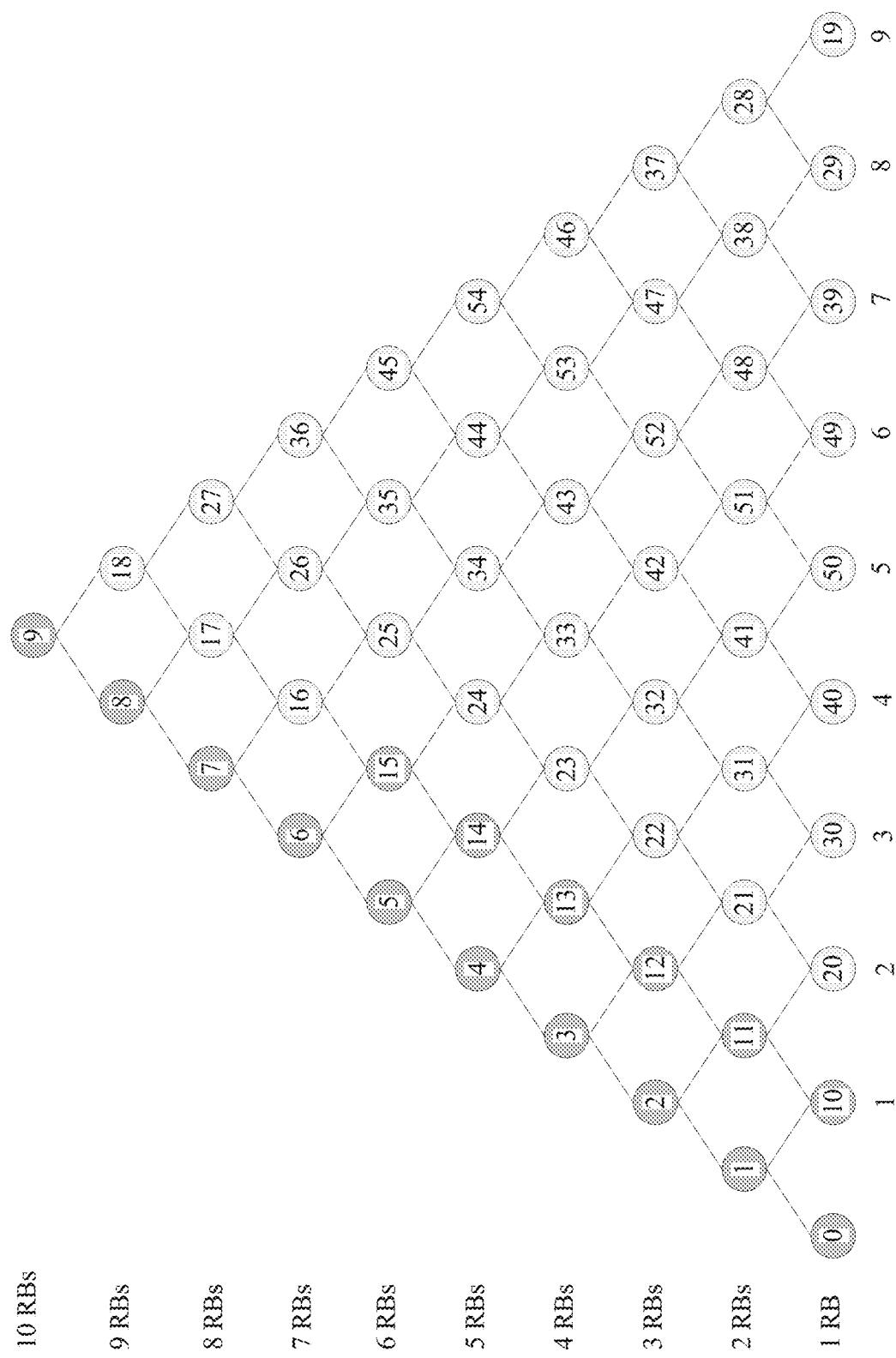
FIG. 18 is another schematic diagram of a dendrogram representing a correspondence between a resource indication value and a virtual resource block according to a method for obtaining a resource indication value in an embodiment of this application.

For example, when the bandwidth of the first BWP is four RBs and the bandwidth of the second BWP is 10 RBs, a dendrogram obtained according to the foregoing generation formula is shown in FIG. 18. It may be learned that a quantity of VRBs that can be allocated to the terminal device has better flexibility.

Figure 19:
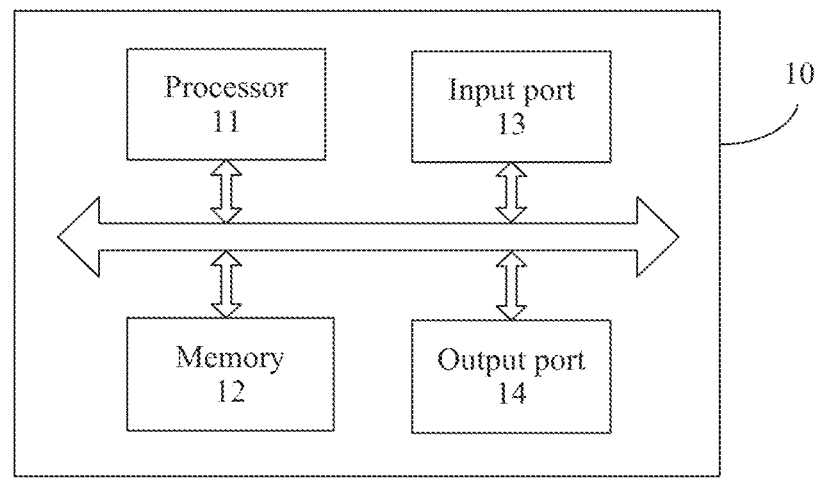
FIG. 19 is a schematic structural diagram of an apparatus for obtaining a resource indication value according to an embodiment of this application.

According to the foregoing method, FIG. 19 is a schematic diagram 1 of an apparatus 10 for obtaining a resource indication value according to an embodiment of this application. As shown in FIG. 19, the apparatus 10 may be a terminal device, or may be a chip or a circuit, for example, a chip or a circuit that may be disposed in a terminal device.

The apparatus 10 may include a processor 11 (an example of a processing unit) and a memory 12. The memory 12 is configured to store an instruction, and the processor 11 is configured to execute the instruction stored in the memory 12, so that the apparatus 10 performs the steps performed by the terminal device in the foregoing method.

Further, the apparatus 10 may further include an input port 13 (an example of a communications unit) and an output port 14 (another example of the communications unit). Further, the processor 11, the memory 12, the input port 13, and the output port 14 may communicate with each other by using an internal connection path, to transmit a control and/or data signal. The memory 12 is configured to store a computer program. The processor 11 may be configured to invoke the computer program from the memory 12 and run the computer program, to control the input port 13 to receive a signal, and control the output port 14 to send a signal, to implement the steps performed by the terminal device in the foregoing method. The memory 12 may be integrated into the processor 11, or the memory 12 and the processor 11 may be disposed separately.

Optionally, if the apparatus 10 is a communications device, the input port 13 may be a receiver, and the output port 14 may be a transmitter. The receiver and the transmitter may be a same physical entity or different physical entities. When the receiver and the transmitter are a same physical entity, the receiver and the transmitter may be collectively referred to as a transceiver.

Optionally, if the apparatus 10 is a chip or a circuit, the input port 13 is an input interface, and the output port 14 is an output interface.

Optionally, if the apparatus 10 is a chip or a circuit, the apparatus 10 may not include the memory 12. The processor 11 may read an instruction (a program or code) in a memory outside the chip, to implement the functions of a transmit end device in the foregoing method.

In an implementation, it may be considered that functions of the input port 13 and the output port 14 are implemented by using a transceiver circuit or a dedicated transceiver chip, and the processor 11 is implemented by using a dedicated processing chip, processing circuit, or processor, or a universal chip.

In another implementation, it may be considered that the terminal device provided in this embodiment of this application is implemented by using a general-purpose computer. To be specific, program code for implementing functions of the processor 11, the input port 13, and the output port 14 are stored in the memory 12, and a general-purpose processor implements the functions of the processor 11, the input port 13, and the output port 14 by executing the code in the memory 12.

The foregoing listed functions and actions of the modules or units in the apparatus 10 for obtaining a resource indication value are merely described by way of example. The modules or units in the apparatus 10 for obtaining a resource indication value may be configured to perform actions or processing procedures performed by the terminal device in the method 200 or the method 300. To avoid repetition, detailed descriptions are omitted herein.

For concepts, explanations, and detailed descriptions used by the apparatus 10 and related to the technical solutions provided in this embodiment of this application and other steps, refer to the descriptions of the content in the foregoing method or other embodiments. Details are not described herein again.

Figure 20:
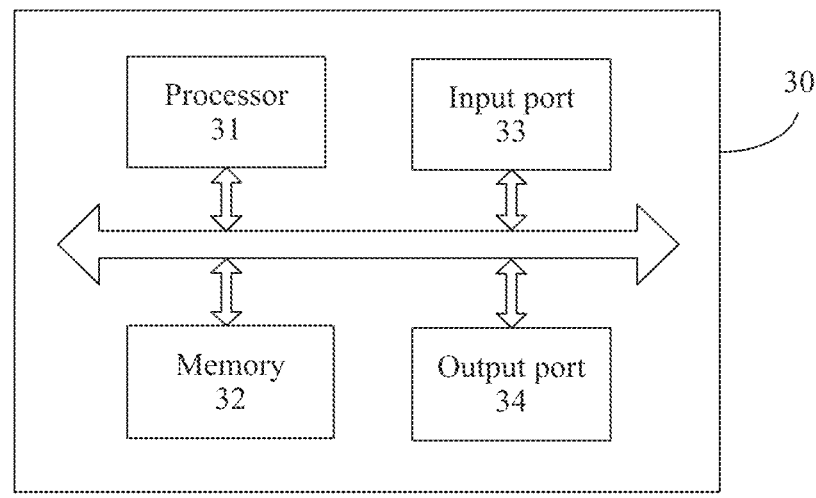
FIG. 20 is another schematic structural diagram of an apparatus for obtaining a resource indication value according to an embodiment of this application.

According to the foregoing method, FIG. 20 is a schematic diagram 2 of a communications apparatus 30 according to an embodiment of this application. As shown in FIG. 20, the apparatus 30 may be a network device, or may be a chip or a circuit, for example, a chip or a circuit that may be disposed in a network device.

The apparatus 30 may include a processor 31 (an example of a processing unit) and a memory 32. The memory 32 is configured to store an instruction, and the processor 31 is configured to execute the instruction stored in the memory 32, so that the apparatus 30 performs steps performed by the network device in the foregoing method.

Further, the apparatus 30 may further include an input port 33 (an example of a communications unit) and an output port 34 (another example of the communications unit). Still further, the processor 31, the memory 32, the input port 33, and the output port 34 may communicate with each other by using an internal connection path, to transmit a control and/or data signal. The memory 32 is configured to store a computer program. The processor 31 may be configured to invoke the computer program from the memory 32 and run the computer program, to control the input port 33 to receive a signal, and control the output port 34 to send a signal, to implement the steps performed by the terminal device in the foregoing method 200. The memory 32 may be integrated into the processor 31, or the memory 32 and the processor 31 may be disposed separately.

The input port 33 is controlled to receive a signal, and the output port 34 is controlled to send a signal, to implement the steps performed by a receive end device in the foregoing method. The memory 32 may be integrated into the processor 31, or the memory 32 and the processor 31 may be disposed separately.

Optionally, if the apparatus 30 is a communications device, the input port 33 is a receiver, and the output port 34 is a transmitter. The receiver and the transmitter may be a same physical entity or different physical entities. When the receiver and the transmitter are a same physical entity, the receiver and the transmitter may be collectively referred to as a transceiver.

Optionally, if the apparatus 30 is a chip or a circuit, the input port 33 is an input interface, and the output port 34 is an output interface.

Optionally, if the apparatus 30 is a chip or a circuit, the apparatus 30 may not include the memory 32. The processor 31 may read an instruction (a program or code) in a memory outside the chip, to implement the functions of the receive end device in the foregoing method.

In an implementation, it may be considered that functions of the input port 33 and the output port 34 are implemented by using a transceiver circuit or a dedicated transceiver chip, and the processor 31 is implemented by using a dedicated processing chip, processing circuit, or processor, or a universal chip.

In another implementation, it may be considered that the receive end device provided in this embodiment of this application is implemented by using a general-purpose computer. To be specific, program code for implementing functions of the processor 31, the input port 33, and the output port 34 are stored in the memory, and a general-purpose processor implements the functions of the processor 31, the input port 33, and the output port 34 by executing the code in the memory.

The foregoing listed functions and actions of the modules or units in the apparatus 30 for obtaining a resource indication value are merely described by way of example. The modules or units in the apparatus 30 for obtaining a resource indication value may be configured to perform actions or processing procedures performed by the network device in the method 200 or the method 300. To avoid repetition, detailed descriptions are omitted herein.

For concepts, explanations, and detailed descriptions for the apparatus 30 and related to the technical solutions provided in this embodiment of this application and other steps, refer to the descriptions of the content in the foregoing method or other embodiments. Details are not described herein again.

Figure 21:
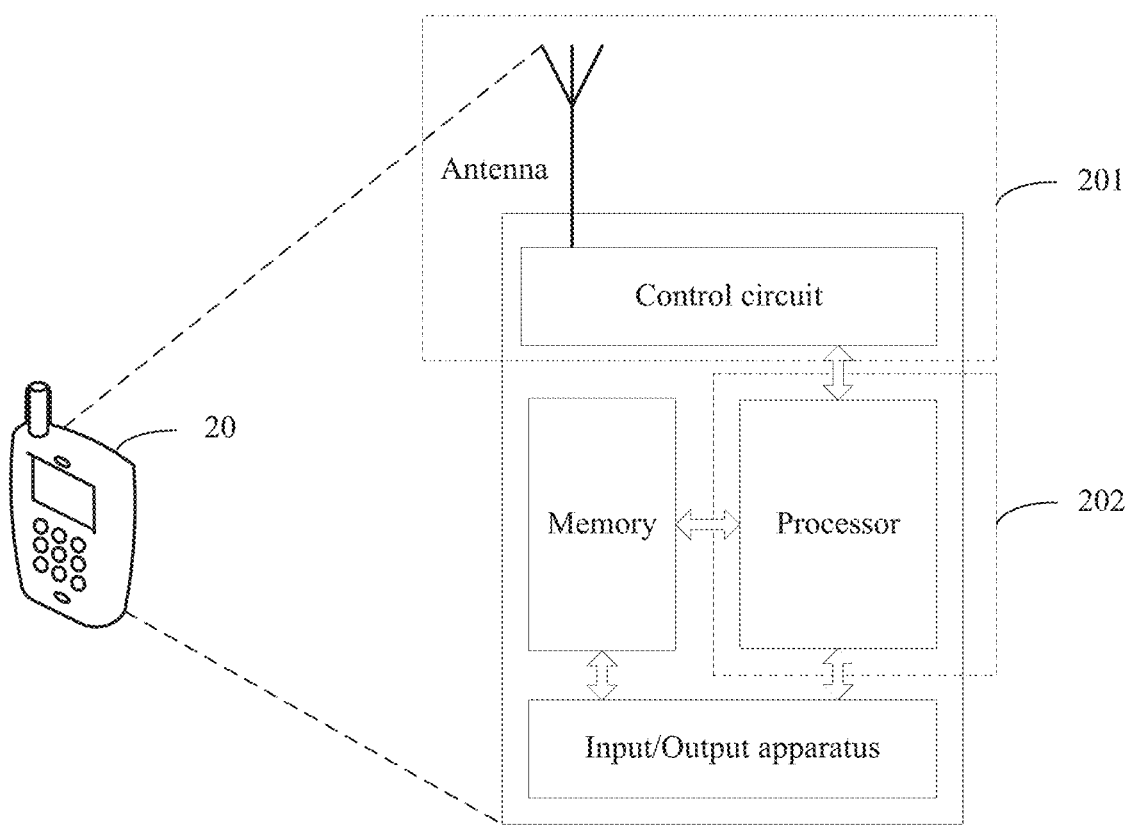
FIG. 21 is a schematic structural diagram of a terminal device according to an embodiment of this application.

FIG. 21 is a schematic structural diagram of a terminal device 20 according to this application. The terminal device 20 may be configured to implement the functions of the terminal device in the foregoing method. The terminal device 20 may be applied to the system shown in FIG. 9. For ease of description, FIG. 21 shows only main components of the terminal device. As shown in FIG. 21, the terminal device 20 includes a processor, a memory, a control circuit, an antenna, and an input/output apparatus.

The processor is mainly configured to: process a communication protocol and communication data, control the entire terminal device, execute a software program, and process data of the software program, for example, support the terminal device in performing the actions described in the embodiment of the method for obtaining a resource indication value. The memory is mainly configured to store a software program and data, for example, store a codebook described in the foregoing embodiments. The control circuit is mainly configured to convert a baseband signal and a radio frequency signal and process a radio frequency signal. The control circuit, together with the antenna, may also be referred to as a transceiver that is mainly configured to receive/send a radio frequency signal in an electromagnetic wave form. The input/output apparatus, such as a touchscreen, a display screen, or a keyboard, is mainly configured to receive data entered by a user and output data to the user.

After the terminal device is powered on, the processor may read a software program in a storage unit, explain and execute an instruction of the software program, and process data of the software program. When data needs to be sent in a wireless manner, the processor performs baseband processing on the to-be-sent data, and outputs a baseband signal to a radio frequency circuit. The radio frequency circuit performs radio frequency processing on the baseband signal, and then sends a radio frequency signal by using the antenna in the electromagnetic wave form. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 21 shows only one memory and only one processor. Actually, the terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 21 integrates functions of the baseband processor and the central processing unit. A person skilled in the art may understand that the baseband processor and the central processing unit may be alternatively processors independent of each other, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built into the processor, or may be stored in a storage unit in a form of a software program, so that the processor executes the software program to implement a baseband processing function.

For example, in this embodiment of this application, an antenna having a transceiving function and a control circuit may be considered as a transceiver unit 201 of the terminal device 20, and a processor having a processing function may be considered as a processing unit 202 of the terminal device 20. As shown in FIG. 21, the terminal device 20 includes the transceiver unit 201 and the processing unit 202. The transceiver unit may also be referred to as a transceiver, a transceiver apparatus, or the like. Optionally, a component configured to implement a receiving function in the transceiver unit 201 may be considered as a receiving unit, and a component configured to implement a sending function in the transceiver unit 201 may be considered as a sending unit. In other words, the transceiver unit 201 includes the receiving unit and the sending unit. For example, the receiving unit may also be referred to as a receiver, a receiver circuit, or the like, and the sending unit may be referred to as a transmitter, a transmitter circuit, or the like.

Figure 22:
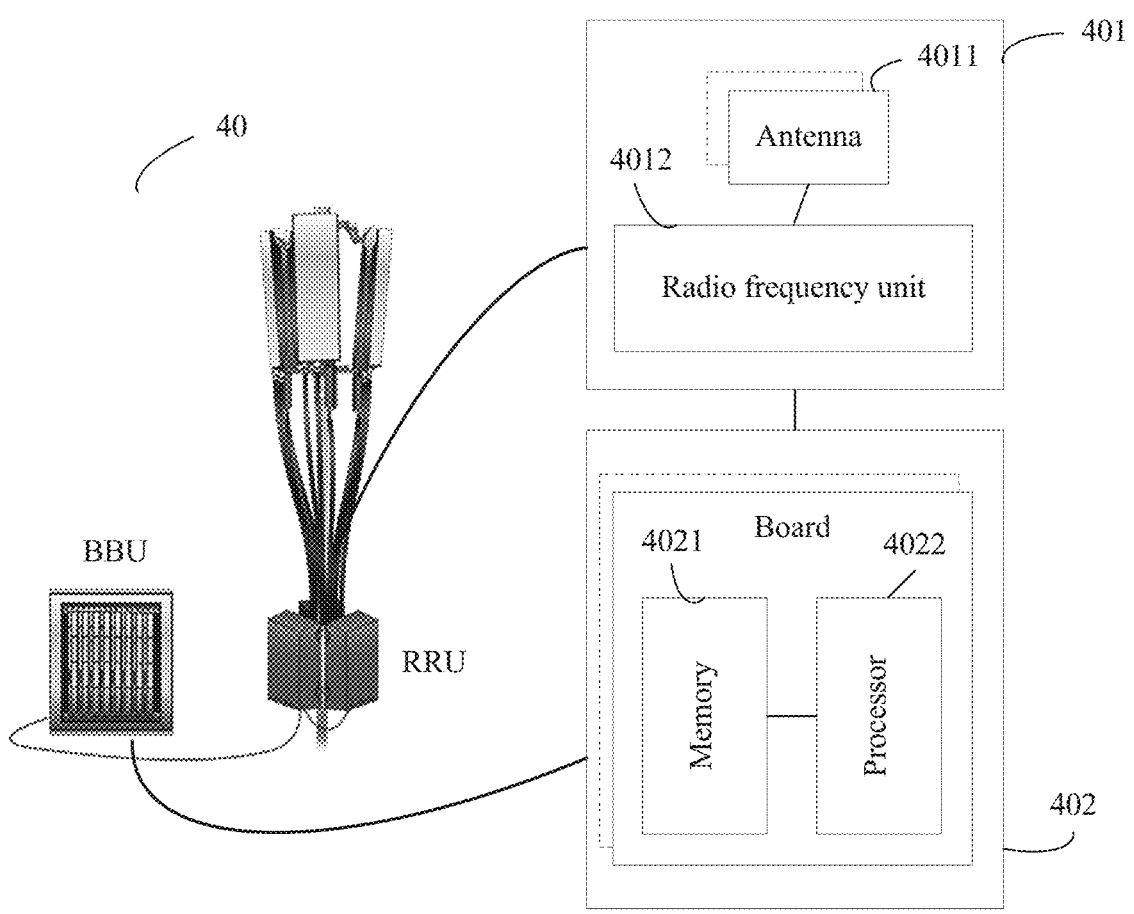
FIG. 22 is a schematic structural diagram of a network device according to an embodiment of this application.

FIG. 22 is a schematic structural diagram of a network device according to an embodiment of this application. The network device may be configured to implement the functions of the network device in the foregoing method. For example, FIG. 22 may be a schematic structural diagram of a base station. As shown in FIG. 22, the network device (for example, the base station) may be applied to the system shown in FIG. 9. The network device 40 includes one or more radio frequency units, for example, a remote radio unit (RRU) 401 and one or more baseband units (BBU) (which may also be referred to as a digital unit (DU)) 402. The RRU 401 may be referred to as a transceiver unit, a transceiver, a transceiver circuit, or the like, and may include at least one antenna 4011 and a radio frequency unit 4012. The RRU 401 is mainly configured to receive and send a radio frequency signal and perform conversion between a radio frequency signal and a baseband signal, for example, configured to send the signaling message in the foregoing embodiments to a terminal device. The BBU 402 is mainly configured to perform baseband processing, control the base station, and the like. The RRU 401 and the BBU 402 may be physically disposed together, or may be physically disposed separately, to be specific, may be on a distributed base station.

The BBU 402 is a control center of the base station, may also be referred to as a processing unit, and is mainly configured to implement a baseband processing function, for example, channel coding, multiplexing, modulation, and spreading. For example, the BBU (the processing unit) 402 may be configured to control the base station 40 to perform an operation procedure of the network device in the method embodiments.

In an example, the BBU 402 may include one or more boards, and a plurality of boards may together support a radio access network (for example, an LTE system, or a 5G system) of a single access standard, or may separately support radio access networks of different access standards. The BBU 402 further includes a memory 4021 and a processor 4022. The memory 4021 is configured to store necessary instructions and data. For example, the memory 4021 stores a codebook and the like in the foregoing embodiments. The processor 4022 is configured to control the base station to perform a necessary action. For example, the processor 4022 is configured to control the base station to perform the operation procedure related to the network device in the foregoing method embodiments. The memory 4021 and the processor 4022 may serve one or more boards. In other words, a memory and a processor may be separately disposed on each board. Alternatively, a plurality of boards may share a same memory and a same processor. In addition, a necessary circuit may be further disposed on each board.

In a possible implementation, with the development of a system-on-chip (SoC) technology, all or some functions of the components 402 and 401 may be implemented by using the SoC technology, for example, implemented by using one base station function chip. The base station function chip integrates components such as a processor, a memory, and an antenna interface. A program of a base-station-related function is stored in the memory. The processor executes the program to implement the base-station-related function. Optionally, the base station function chip can also read a memory outside the chip to implement the base-station-related function.

It should be understood that a structure of the network device shown in FIG. 22 is merely a possible form, but should not constitute any limitation on this embodiment of this application. In this application, a possibility that there may be a base station structure in another form in the future is not excluded.

According to the method in the embodiments of this application, an embodiment of this application further provides a communications system, including the transmit end device and the receive end device.

The character "/" in this specification usually indicates an "or" relationship between associated objects.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    determining, by a network device, a quantity of bits of a resource indication value (RIV) based on a first bandwidth part;
    sending, by the network device, downlink control information comprising including the resource indication value, wherein the downlink control information indicates a data channel in a second bandwidth part; and
    sending or receiving the data channel occupying a plurality of contiguous virtual resource blocks, wherein
    a number identifying a starting virtual resource block of the contiguous virtual resource blocks $RB_{start}$, a quantity of the contiguous virtual resource blocks $L_{RBs}$, and the RIV satisfy:

$RB_{start} = \lfloor K \cdot RB'_{start} \rfloor$, and $L_{RBs} = \lfloor K \cdot L'_{RBs} \rfloor$, wherein K is a maximum value of at least one candidate value K', wherein the at least one candidate value K' satisfies:

$K \leq \lfloor N_{RB}^{BWP2} / N_{RB}^{BWP1} \rfloor$, wherein $N_{RB}^{BWP1}$ refers to a bandwidth of the first bandwidth part, and $N_{RB}^{BWP2}$ refers to a bandwidth of the second bandwidth part; and $RIV = N_{RB}^{BWP1}(L'_{RBs}-1) + RB'_{start}$ when $(L'_{RBs}-1) \leq \lfloor N_{RB}^{BWP1}/2 \rfloor$, or $RIV = N_{RB}^{BWP1}(N_{RB}^{BWP1}-L'_{RBs}+1) + (N_{RB}^{BWP1}-1-RB'_{start})$ when $(L'_{RBs}-1) > \lfloor N_{RB}^{BWP1}/2 \rfloor$.

2. The method according to claim 1, wherein the at least one candidate value K' is included in a candidate set, wherein the candidate set includes 1, 2, 4 and 8.

3. The method according to claim 1 wherein K is one of 1, 2, 4 or 8.

4. The method according to claim 1, wherein K is 1.

5. An apparatus comprising:
    at least one processor; and
    a memory coupled to the at least one processor and storing programming instructions for execution by the at least one processor, the programming instructions instruct the at least one processor to:
    determine a quantity of bits of a resource indication value (RIV) based on a first bandwidth part;
    send downlink control information including the resource indication value, wherein the downlink control information indicates a data channel in a second bandwidth part; and
    send or receive the data channel occupying a plurality of contiguous virtual resource blocks, wherein
    a number identifying a starting virtual resource block of the contiguous virtual resource blocks $RB_{start}$, a quantity of the contiguous virtual resource blocks $L_{RBs}$, and the RIV satisfy:

$RB_{start} = \lfloor K \cdot RB'_{start} \rfloor$, and $L_{RBs} = \lfloor K \cdot L'_{RBs} \rfloor$, wherein K is a maximum value of at least one candidate vale K', wherein the at least one candidate value K' satisfies:

$K \leq \lfloor N_{RB}^{BWP2} / N_{RB}^{BWP1} \rfloor$, wherein $N_{RB}^{BWP1}$ refers to a bandwidth of the first bandwidth part, and $N_{RB}^{BWP2}$ refers to a bandwidth of the second bandwidth part; and $RIV = N_{RB}^{BWP1}(L'_{RBs}-1) + RB'_{start}$ when $(L'_{RBs}-1) \leq \lfloor N_{RB}^{BWP1}/2 \rfloor$, or $RIV = N_{RB}^{BWP1}(N_{RB}^{BWP1} - L'_{RBs}+1) + (N_{RB}^{BWP1}-1-RB'_{start})$ when $(L'_{RBs}-1) > \lfloor N_{RB}^{BWP1}/2 \rfloor$.

6. The apparatus according to claim 5, wherein the at least one candidate value K' is included in a candidate set, wherein the candidate set includes 1, 2, 4 and 8.

7. The apparatus according to claim 6, wherein K is one of 1, 2, 4 and 8.

8. The apparatus according to claim 5, wherein K is 1.

9. A non-transitory computer-readable storage medium, comprising executable instructions, wherein the executable instructions, when executed by a computer, cause the computer to:
- determine a quantity of bits of a resource indication value based on a first bandwidth part;
- send downlink control information including the resource indication value (RIV), wherein the downlink control information indicates a data channel in a second bandwidth part; and
- send or receive the data channel occupying a plurality of contiguous virtual resource blocks, wherein
- a number identifying a starting virtual resource block of the contiguous virtual resource blocks $RB_{start}$, a quantity of the contiguous virtual resource blocks $L_{RBs}$, and the RIV satisfy:

$RB_{start} = \lfloor K \cdot RB'_{start} \rfloor$, and $L_{RBs} = \lfloor K \cdot L'_{RBs} \rfloor$, wherein K is a maximum value of at least one candidate vale K', wherein the at least one candidate value K' satisfies:

$K \leq \lfloor N_{RB}^{BWP2}/N_{RB}^{BWP1} \rfloor$, wherein $N_{RB}^{BWP1}$ refers to a bandwidth of the first bandwidth part, and $N_{RB}^{BWP2}$ refers to a bandwidth of the second bandwidth part; and $RIV = N_{RB}^{BWP1}(L'_{RBs}-1) + RB'_{start}$ when $(L'_{RBs}-1) \leq \lfloor N_{RB}^{BWP1}/2 \rfloor$, or $RIV = N_{RB}^{BWP1}(N_{RB}^{BWP1} - L'_{RBs}+1) + (N_{RB}^{BWP1}-1-RB'_{start})$ when $(L'_{RBs}-1) > \lfloor N_{RB}^{BWP1}/2 \rfloor$.

10. The non-transitory computer-readable storage medium according to claim 9, wherein the at least one candidate value K' is included in a candidate set, wherein the candidate set includes 1, 2, 4 and 8.

11. The non-transitory computer-readable storage medium according to claim 9, wherein K is one of 1, 2, 4 and 8.

12. The non-transitory computer-readable storage medium according to claim 9, wherein K is 1.

* * * * *

UNITED STATES PATENT AND TRADEMARK OFFICE
CERTIFICATE OF CORRECTION

PATENT NO. : 11,632,206 B2
APPLICATION NO. : 17/085330
DATED : April 18, 2023
INVENTOR(S) : Zheng Chen et al.

Page 1 of 1

It is certified that error appears in the above-identified patent and that said Letters Patent is hereby corrected as shown below:

In the Claims

In Column 30, Line 9, in Claim 1, before "including" delete "comprising".

In Column 30, Line 25, in Claim 1, delete "K" and insert -- K' --.

In Column 30, Line 64, in Claim 5, delete "vale" and insert -- value --.

In Column 30, Line 67, in Claim 5, delete "K" and insert -- K' --.

In Column 32, Line 5, in Claim 9, delete "vale" and insert -- value --.

In Column 32, Line 9, in Claim 9, delete "K" and insert -- K' --.

Signed and Sealed this
Fourth Day of July, 2023

Katherine Kelly Vidal
*Director of the United States Patent and Trademark Office*